United States Patent [19]

Sonnenberg

[11] Patent Number: 5,796,813
[45] Date of Patent: Aug. 18, 1998

[54] METHOD FOR ROUTING A CALL

[75] Inventor: Edward Sonnenberg, Coral Springs, Fla.

[73] Assignee: Siemens Telecom Networks, Boca Raton, Fla.

[21] Appl. No.: 694,380

[22] Filed: Aug. 8, 1996

Related U.S. Application Data

[62] Division of Ser. No. 497,408, Jun. 30, 1995.

[51] Int. Cl.$^6$ .................................................. H04M 3/42
[52] U.S. Cl. ........................... 379/220; 379/207; 379/211
[58] Field of Search .................................. 379/221, 207, 379/201, 219, 220, 211, 210, 127, 265, 112, 114, 115, 229

[56] References Cited

U.S. PATENT DOCUMENTS

| | | | |
|---|---|---|---|
| 4,162,377 | 7/1979 | Mearns | 379/127 |
| 4,191,860 | 3/1980 | Weber | 379/115 |
| 4,555,594 | 11/1985 | Friedes et al. | 379/220 |
| 4,565,903 | 1/1986 | Riley | 379/201 |
| 4,754,479 | 6/1988 | Bicknell et al. | 379/211 |
| 4,866,763 | 9/1989 | Cooper et al. | 379/201 |
| 5,023,868 | 6/1991 | Davidson et al. | 379/112 |
| 5,033,079 | 7/1991 | Catron et al. | 379/211 |
| 5,142,654 | 8/1992 | Sonberg et al. | 455/433 |
| 5,206,901 | 4/1993 | Harlow et al. | 379/211 |
| 5,222,125 | 6/1993 | Creswell et al. | 379/114 |
| 5,237,604 | 8/1993 | Ryan | 379/220 |
| 5,243,645 | 9/1993 | Bissell et al. | 379/211 |
| 5,259,026 | 11/1993 | Johnson | 379/213 |
| 5,270,701 | 12/1993 | Ito et al. | 379/211 |
| 5,329,578 | 7/1994 | Brennan et al. | 379/211 |
| 5,333,184 | 7/1994 | Doherty et al. | 379/229 |
| 5,333,185 | 7/1994 | Burke et al. | 379/127 |
| 5,375,167 | 12/1994 | Bales et al. | 379/207 |
| 5,386,467 | 1/1995 | Ahmad | 379/207 |
| 5,416,833 | 5/1995 | Harper et al. | 379/265 |

(List continued on next page.)

OTHER PUBLICATIONS

EdS, "Local Number Portability SPA Model Evolution to Name & Address", pp. 1–3, Mar. 1995.

Sonnenberg et al., "Siemens Stromberg–Carlson's Contribution to MCI Metro's Local Number Portability Architecture Task Force Team," pp. 1–13 and attachments 1 and 2, Feb. 1995.

"Local Number Portability—MCI Metro Outline," BNR, MCI, Northern Telecom, Slides 1–24, Dec. 1994.

EdS, "Proposal for Directory Number Portability among Service Providers", pp. 1–7, Nov. 1994.

*Primary Examiner*—Krista Zele
*Assistant Examiner*—Scott Wolinsky
*Attorney, Agent, or Firm*—Joseph S. Codispoti

[57] ABSTRACT

A method for enabling a plurality of Local Service Providers within a common Numbering Plan Area (NPA) to serve Subscribers of the plurality of Local Service Providers. The method includes the step of assigning to each Subscriber of a Local Service Provider within the common NPA a unique three digit code, hereinafter referred to as a SPA code. The service provider area (SPA) code is used by the telephone system in the same manner presently used for routing calls made when a calling Subscriber dials the NPA code of the called party. Here, however, the SPA code is not dialed by the calling Subscriber. The dialed directory number, NXX-XXXX, of a called Subscriber subscribed to a different Local Service Provider, is sent to a database. The database maintains a record of the relationships between the directory numbers of Subscribers and the SPA codes of the Subscribers. The database retrieves the SPA code associated with the dialed directory number presently serving the called Subscriber. The call is routed as SPA-NXX-XXXX. Because the ten digit format, SPA-NXX-XXXX, is the same as the present NPA-NXX-XXXX, ten digit format, existing signaling and routing mechanisms may be used to route the call. Thus, each one of the Subscribers of each one of the plurality of Local Service Providers is assigned a common SPA code, each one of the Local Service Providers having a different SPA code.

5 Claims, 23 Drawing Sheets

U.S. PATENT DOCUMENTS

| | | | |
|---|---|---|---|
| 5,440,614 | 8/1995 | Sonberg et al. | 455/432 |
| 5,452,351 | 9/1995 | Yamamoto | 379/207 |
| 5,473,681 | 12/1995 | Partridge, III | 379/221 |
| 5,475,749 | 12/1995 | Akinpelu et al. | 379/207 |
| 5,481,603 | 1/1996 | Gutierrez et al. | 379/221 |
| 5,491,742 | 2/1996 | Harper et al. | 379/201 |
| 5,509,058 | 4/1996 | Sestak et al. | 379/201 |
| 5,515,427 | 5/1996 | Carlsen et al. | 379/220 |
| 5,550,910 | 8/1996 | DeJager | 379/201 |
| 5,550,912 | 8/1996 | Akinpelu et al. | 379/201 |
| 5,559,877 | 9/1996 | Ash et al. | 379/219 |
| 5,598,464 | 1/1997 | Hess et al. | 379/207 |
| 5,661,792 | 8/1997 | Akinpelu et al. | 379/221 |

Note*: If Vacant in XXXX Table, check if SPA classmark against source of call or if returned from LNP Database.
 —If either case is YES, give recorded announcement. If Vacant in any other Table, give announcement.
 —If both conditions are NO, access LNP Database and reenter Local Translator with returned Results.

Note*: If Vacant in XXXX Table, check if SPA classmark against source of call or if returned from LNP Database.
  - If either case is YES, give recorded announcement. If Vacant in any other Table, give announcement.
  - If both conditions are NO, access LNP Database and reenter Local Translator with returned Results.

Note: No Database queries required for Intraswitch using the IN Method.

METHOD FOR ROUTING A CALL

This is a divisional of application Ser. No. 08/497,408 filed Jun. 30, 1995.

BACKGROUND OF THE INVENTION

This invention relates generally to methods for routing telephone calls and more particularly to methods for routing telephone calls to Subscribers of different service providers within a common Numbering Plan Area (NPA).

As is known in the art, telephone calls are routed from a calling Subscriber to a called Subscriber through a network of switches. Subscribers connected to a common switch, or End Office (EO) are assigned a unique directory number, NXX-XXXX, where "N" refers to any digit except 0 or 1 and "X" refers to any one of 10 digits. Thus, for example, all telephone Subscribers in a small town are connected to a single, "local" switch (or End Office (EO)) and all telephones directly served, or connected to the switch, or End Office (EO) have a directory number which uses as the first three digits thereof, a switch, or End Office (EO) code, NXX. These three digit prefixes are sometimes referred to as an "exchange or office code". The last four digits, XXXX, are referred to as the SUBSCRIBER's line code. Larger towns may have two, or more larger switches, each with several different three digit prefix switch or exchange codes, NXXs.

As is also known in the art, the telephone system divides the United States into "area codes"; more technically referred to as Numbering Plan Area (NPA) codes. When a call is made from one "area code" to another "area code", the three digit Numbering Plan Area code, NPA, prefix must be supplied to the called Subscriber's directory number (DN). Thus, in effect, each telephone Subscriber is associated with a unique ten digit directory number; NPA-NXX-XXXX.

As is also known in the art, the United States has been subdivided into Local Access and Transport Areas (LATAs), each LATA includes a contiguous sub set of the Numbering Plan Areas (NPAs). Calls between LATAs are routed via inter-exchange carriers, IXCS. Such inter-LATA calls need only be routed to the appropriate IXC carrier based on the calls originator (i.e., the calling Subscriber's) Inter Exchange Carrier (IXC) access code (either dialed or presubscribed). Intra-LATA calls are routed based on the directory number, which is of the format NPA-NXX-XXXX. The NPA-NXX (Area code-exchange code) prefix is used to route the call to the serving, local switch, or End Office (EO). From there the local switch routes the call to the Subscriber's line which is designated by the last four digits, XXXX.

As is also known in the art, in the past, in most regions of the United States, a Local Service Provider (LSP) (i.e., a regional telephone company) had exclusive routing of calls within a Local Access and Transport Area (LATA). The regional telephone company therefore controlled the local switches and assigned the connected subscriber a directory number (DN). Today, each LATA may be served by other, competing Local Service Providers (LSPs). Therefore, if a Subscriber wishes to be served by a different Local Service Provider of the same Local Access and Transport Area LATA, the Subscriber would have to change the previously assigned directory number (DN), since directory numbers are assigned to a switch in blocks and are used as a means for routing calls to the switch serving those local directory numbers as described above.

If a Subscriber wished to keep the previously assigned directory number, calls to the Subscriber had to be routed, via the switch which owns the directory number block, and from there to the Subscriber's new switch using an unpublished directory number for that routing purpose. Such method, however, ties up the new switch during the period of time the call is routed through it.

One technique suggested to enable the Subscriber to maintain the previously assigned directory number (DN) after changing to a new Local Service Provider (LSP) in the same Local Access and Transport Area (LATA) is to translate the previously assigned directory number (DN) to a Location Routing Number (LRN) code which is any valid switch code, NXX, assigned to the switch which presently serves the Subscriber. The Numbering Plan Area (NPA) code would be the same as the NPA of the directory number (DN) because the Subscriber has not physically moved to another area. The NPA-LRN code is passed along with the directory number (DN), NPA-NXX-XXXX to a tandem as well as terminating switches end offices (EOs). Thus, a two numbers are used: NPA-LRN plus NPA-NXX-XXXX. The NPA-LRN is used for routing and the NPA-NXX-XXXX is used in the terminating switch to locate the Subscriber's line and any associated features (i.e. special services, such as call waiting, call forwarding, etc.) which are encoded as "classmarks". Such technique requires that the existing trunk signaling protocols be modified, especially multi-frequency and Dial Pulse, which do not support passing two numbers associated with the called Subscriber.

SUMMARY OF THE INVENTION

In accordance with the present invention, a method is provided for enabling a plurality of Local Service Providers within a common Numbering Plan Area (NPA) to serve Subscribers of the plurality Local Service Providers. The method includes the step of assigning to each Local Service Provider within the common Numbering Plan Area (NPA) a different service provider area (SPA) code. In accordance with another feature of the invention a method is provided for assigning to each Subscriber of a Local Service Provider within the common Numbering Plan Area (NPA) one of the service provider area (SPA) codes. The service provider area (SPA) code is used by the telephone system in the same manner presently used for routing calls made when a calling Subscriber dials the Numbering Plan Area (NPA) code of the called party. Here, however, the service provider area (SPA) code is not dialed by the calling Subscriber. The dialed directory number (DN), NXX-XXXX, of a called Subscriber subscribed to a different Local Service Provider, is sent to a database (DB) external to the local switch, i.e., an External Local Number Portability Database (LNP DB). The External Local Number Portability Database (LNP DB) maintains a record of the relationships between the directory numbers of Subscribers and the service provider area (SPA) codes of the Subscribers. The External Local Number Portability Database (LNP DB) retrieves the service provider area (SPA) code associated with the dialed directory number (DN) presently serving the called Subscriber. The call is routed as SPA-NXX-XXXX. Because the ten digit format, SPA-NXX-XXXX, is the same as the present NPA-NXX-XXXX, ten digit format, existing signaling and routing mechanisms may be used to route the call.

In accordance with still another feature of the invention, a method is provided for enabling a plurality of Local Service Providers within common Numbering Plan Area (NPA) to serve Subscribers of the plurality Local Service Providers. The method includes the step of assigning to each Local Service Provider within the common Numbering Plan Area (NPA) a different service provider area (SPA) code. The code is associated with each one of the Subscribers of such one of the local area providers within the common Numbering Plan Area (NPA). Further, the method includes the step of assigning to each one of the Subscribers of each one of the plurality of local area providers, the service provider area (SPA) code associated with its Local Service Provider, each one of the Local Service Providers having a different service provider area (SPA) code.

With such an arrangement, calls are routed to a called Subscriber having a directory number assigned by a previous Local Service Provider using the same routing technique used to route a call to another Numbering Plan Area.

In accordance with still another feature of the invention, a method is provided for routing a call to a subscriber having been assigned a directory number NXX-XXXX by all Local Service Providers and having changed to a different Local Service Provider within a common Numbering Plan Area. An External Local Number Portability Database (LNP DB) is provided for storing a relationship between each NXX-XXXX directory number (DN) assigned to Subscribers within the common Numbering Plan Area (NPA) and an call routing identifier, SPA, associated with the directory number, NXX-XXXX where: SPA is a three digit designation code assigned to each one of the Local Service Providers within a common Numbering Plan Area (NPA), each one of the Local Service Providers being assigned a different Local Service Provider area (SPA) code in the common Numbering Plan Area (NPA); and, NXX is a three digit exchange code representative of a local exchange area within the common Numbering Plan Area (NPA). The number, NXX-XXXX, dialed by a calling Subscriber is converted, in the External Local Number Portability Database (LNP DB), into the SPA-NXX-XXXX call routing identifier output assigned to the called Subscriber. The call placed by the calling Subscriber to the called Subscriber is routed using the call routing identifier output, SPA-NXX-XXXX.

In accordance with another feature of the invention, a method is provided for routing a call to a Subscriber having been assigned a directory number NXX-XXXX, and having moved to a different location serviced by a switch having a different exchange code, NYY, and a line code YYYY. The method includes providing a database storing a relationship between the NXX-XXXX directory number assigned to the Subscriber and the different exchange code NYY and line code YYYY of the Subscriber. The dialed number NXX-XXXX is converted in the database into SPA-NYY-YYYY and the call is routed to the called Subscriber as if the call were dialed as SPA-NYY-YYYY.

More particularly, a method is provided for routing a call to a Subscriber having been assigned a directory number NXX-XXXX by one Local Service Provider and having changed to a different Local Service Provider, both service providers providing service within a common Numbering Plan Area (NPA), and wherein the Subscriber has moved to a different location serviced by a switch having a different exchange code, NYY, and a line code YYYY. The method includes the step of providing a database storing:

(i) a relationship between each NXX-XXXX directory number assigned to Subscribers within the common Numbering Plan Area (NPA) who have changed to another Local Service Provider, and a call routing identifier, SPA, associated with the directory number, NXX-XXXX;

(ii) a relationship between the NXX-XXXX directory number assigned to the Subscriber and the location code comprised of different exchange code NYY and line code YYYY of the Subscriber where:

SPA is a three digit designation code assigned to each one of the Local Service Providers within a common Numbering Plan Area (NPA), each one of the Local Service Providers being assigned a different Local Service Provider area (SPA) code in the common Numbering Plan Area (NPA); and, NXX is a three digit designation code representative of an exchange area within the common Numbering Plan Area (NPA).

The number, NXX-XXXX is converted in the database into NYY-YYYY and routed to the called Subscriber using the call routing identifier output prefixed to the last seven digits of the location code, SPA-NYY-YYYY.

With such method, the database allows each SPA-NYY-YYYY to be stored against the corresponding directory number NXX-XXXX where NYY-YYYY is of the same seven digit format and has the same meaning to the telephone system, albeit a different value than NXX-XXXX. The SPA-NYY-YYYY format allows the call to be routed to a different exchange area or even a different Numbering Plan Area (NPA) in the same Local Access Area and Transport Area (LATA).

In accordance with still another feature of the invention, a method is provided-for reducing the number of accesses, or queries, to the External Local Number Portability Database (LNP DB). The method includes the steps of: determining, from a database of a local switch, whether an incoming call to the local switch is assigned to the switch, and if not, determining from the External Local Number Portability Database (LNP DB), a Service Provider Area (SPA) assigned to the called Subscriber; and, populating the database of the local switch for the called subscriber, the SPA determined from the External Local Number Portability Database (LNP DB). Thus, when the Subscriber is called again, the SPA stored in the database of the local switch is added as a three digit prefix to the called party directory number. Thus, with such method, the External Local Number Portability Database (LNP DB) need not be accessed for calls made to the Subscriber after the database of the local switch has been populated with the Subscriber's SPA. In accordance with still another feature of the invention, a method is provided for transferring a Subscriber of a current Local Service Provider having the Subscriber's present Service Provider Area (SPA) code to a future Local Service Provider having the Subscriber's future Service Provider Area (SPA') code within a common Numbering Plan Area (NPA) to serve Subscribers of the plurality Local Service Providers comprising the step of: providing each local switch of each of the Local Service Providers with an internal database having associated with each Subscriber line number therein a local indicator field, such field providing, in the such field of current Local Service Provider's switch an indication that the Subscriber is in the process of leaving such switch and for providing, in the such field of future Local Service Provider's switch an indication that the Subscriber is in the process of coming to such switch.

In accordance with one embodiment of the invention, the method includes the step of: marking an internal database of the current Local Service Provider's switch with a LEAVING indication; marking an internal database of the future Local Service Provider switch with a COMING indication; and, querying a local number portability database from either the current Local Service Provider's switch or the future Local Service Provider's switch when such LEAVING or COMING indication is marked to determine whether the local number portability database has been updated with the Subscriber SPA designation of the future Local Service Provider.

In accordance with another feature of the invention, a system for routing a call to a subscriber having been assigned a directory number NXX-XXXX by Local Service Providers in a Numbering Plan Area and having changed to a different Local Service Provider within the Numbering Plan Area, such system comprising: a plurality of databases for storing a relationship between each NXX-XXXX directory number assigned to Subscribers within the common Numbering Plan Area and an call routing identifier, SPA, associated with the directory number, NXX-XXXX where: SPA is a three digit designation code assigned to each one of the Local Service Providers within the common Numbering Plan Area, each one of the Local Service Providers being assigned a different Local Service Provider area (SPA) code in the common Numbering Plan Area (NPA); and, NXX is a three digit exchange code representative of a local exchange area within the common Numbering Plan Area.

DESCRIPTION OF THE PREFERRED EMBODIMENTS

Figure 1:
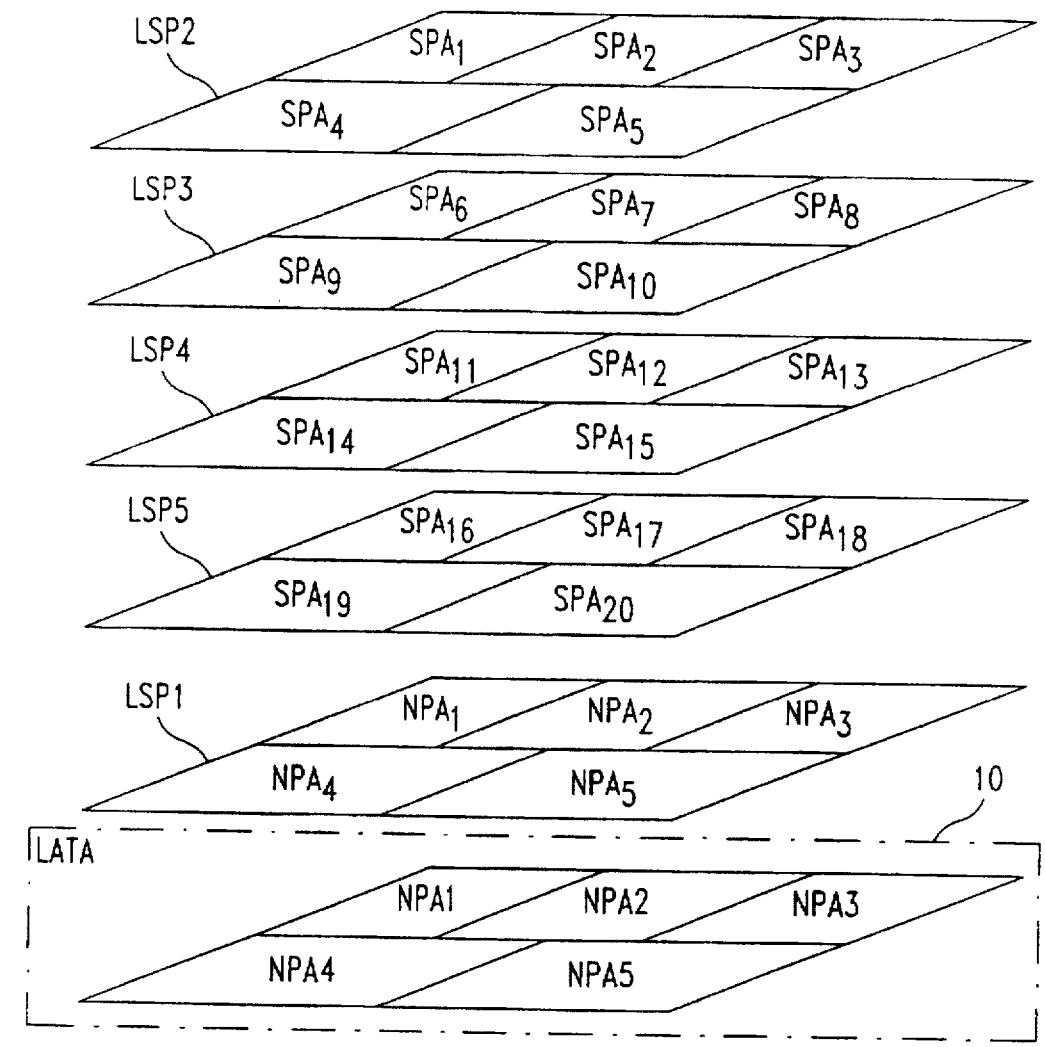
FIG. 1 is a diagram showing a plurality of Local Service Providers (LSPs) within a common Numbering Plan Area (NPA) wherein Subscribers are able to move change between such Local Service Providers (LSPs)

Referring now to FIG. 1, a method for enabling a plurality of Local Service Providers within a common Numbering Plan Area (NPA) to serve Subscribers of the plurality of Local Service Providers will be described. Here, a Local Access and Transport Area (LATA) 10 is shown served by a plurality of, here for example, five different Local Service Providers, LSP1–LSP5. Here, in this example, the Local Access and Transport Area (LATA) 10 includes five contiguous Numbering Plan Areas (NPAs), here NPA1–NPA5, as indicated. For each one of the Numbering Plan Areas, NPA1–NPA5, each one of the Local Service Providers LSP1–LSP5, is assigned a Service Area Provider (SPA) code unique to the Local Service Provider. Further, the Local Service Provider originally servicing the LATA may be assigned, as its SPA, the NPA. Thus, here, for example, the Local Service Provider LSP1 originally serving the Numbering Plan Area NPA1, is assigned, as its service provider area (SPA) code, the three digit prefix code $NPA_1$; and, Local Service Providers LSP2, LSP3, LSP4, LSP5 are assigned service provider area (SPA) codes $SPA_1$, $SPA_6$, $SPA_{11}$, $SPA_{16}$, respectively, as indicated. The TABLE I below shows the SPAs assigned to the LSPs in each of the NPAs of the exemplary LATA:

TABLE I

| Local Service Provider | Numbering Plan Area | Service Provider Area (SPA) Code |
|---|---|---|
| LSP1 | NPA1 | $NPA_1$ |
| LSP2 | NPA1 | $SPA_1$ |
| LSP3 | NPA1 | $SPA_6$ |
| LSP4 | NPA1 | $SPA_{11}$ |
| LSP5 | NPA1 | $SPA_{16}$ |
| LSP1 | NPA2 | $NPA_2$ |
| LSP2 | NPA2 | $SPA_2$ |
| LSP3 | NPA2 | $SPA_7$ |
| LSP4 | NPA2 | $SPA_{12}$ |
| LSP5 | NPA2 | $SPA_{17}$ |
| LSP1 | NPA3 | $NPA_3$ |
| LSP2 | NPA3 | $SPA_3$ |
| LSP3 | NPA3 | $SPA_8$ |
| LSP4 | NPA3 | $SPA_{13}$ |
| LSP5 | NPA3 | $SPA_{18}$ |
| LSP1 | NPA4 | $NPA_4$ |
| LSP2 | NPA4 | $SPA_4$ |
| LSP3 | NPA4 | $SPA_9$ |
| LSP4 | NPA4 | $SPA_{14}$ |
| LSP5 | NPA4 | $SPA_{19}$ |
| LSP1 | NPA5 | $NPA_5$ |
| LSP2 | NPA5 | $SPA_5$ |
| LSP3 | NPA5 | $SPA_{10}$ |
| LSP4 | NPA5 | $SPA_{15}$ |
| LSP5 | NPA5 | $SPA_{20}$ |

It should be noted that the Service Provider Area (SPA) codes are, pseudo-NPAs covering the exact same area as the corresponding NPAs. As can be seen in FIG. 1, this results in several layers of congruent pseudo-Numbering Plan Areas.

Therefore, a Service Provider Area (SPA) code is assigned to each Local Service Provider (LSP) serving a particular Numbering Plan Area (NPA). The assigned Service Provider Area (SPA) codes may not be codes that are used as Numbering Plan Area (NPA) codes within the LATA or in the immediately adjacent LATAs; except for one of the Local Service Providers, as for the example presented above, for Local Service Provider, LSP1. However, they may be codes that are assigned to other LATAs. This allows reuse of NPA codes in a given LATA that are assigned to other LATAs. Thus, for the example presented above, $SPA_{12}$, may be the Numbering Plan Area (NPA) code in another, non-adjacent, LATA, not shown. Preferably, only the most distant NPA codes should be used as the SPA codes.

Figure 2:
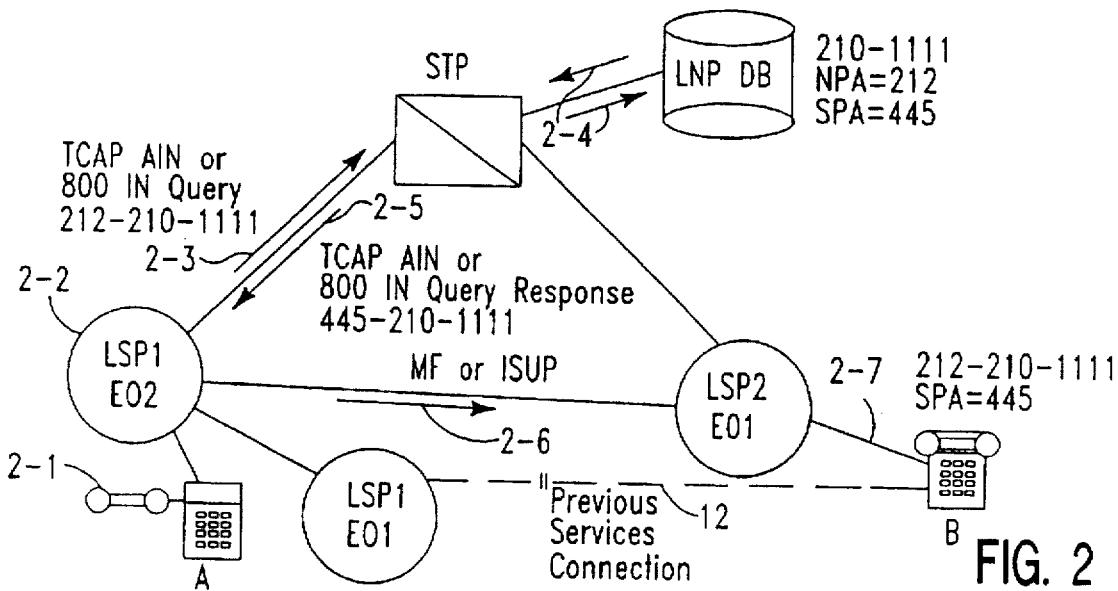
FIG. 2 is a schematic diagram showing a call being routed to a Subscriber having changed Local Service Providers (LSPs) according to the invention.

Referring now to FIG. 2 a general overview of the method for routing a call where a Subscriber has changed Local Service Providers is described. Thus, in this example, Subscriber B, located in a portable NPA-NXX, changes from Local Service Provider (LSP1) to Local Service Provider (LSP2) without changing its directory number (DN). Here, Subscriber B's directory number (DN) is 212-210-1111: where: the first three digits, "212" is the Numbering Plan Area (NPA) (i.e., "area code"); and the fourth, fifth and sixth digits, "210", designate the assigned local switch, or "exchange" of Subscriber B. Here, in this example, Subscriber A is connected to End Office (EO2), and Subscriber B is connected to End Office (EO1).

The previous service routing connection (indicated by the dashed line 12) was as follows: Subscriber A dialed 210-2111. Local Service Provider (LSP1) at End Office (EO2), which is connected to Subscriber A, routed the call to End Office (EO1) which is connected to Subscriber B.

The new routing flow is as follows:

(Step 2-1) Subscriber A calls Subscriber B using 210-2111.

(Step 2-2)—The Local Service Provider (LSP1) End Office (EO1) checks its internal database not shown, as distinguished from the External Local Number Portability Database (LNP DB)) to determine that the 210 code is not its own exchange code but is an NXX that is served by more than one Local Service Provider (LSP). (The internal database is included in the local translator to be described in connection with FIG. 4, below).

(Step 2-3)—The call is translated; (i.e., Transaction Capabilities Application Part (TCAP) processing adds the Numbering Plan Area (NPA) code, here known to be Subscriber B's original, local, NPA of "212"), and a query for 212-210-1111 is launched to the External Local Number Portability Database (LNP DB) for the presence of Subscriber B. (The routing to, and from, the External Local Number Portability Database (LNP DB) may be Advanced Intelligent Network (AIN) or Intelligent Network (AI) protocols).

(Step 2-4)—The Signal Transfer Point (STP) queries the External Local Number Portability Database (LNP DB) thereof for the presence of Subscriber B and, in this example, the Service Provider Area (SPA) code of 445 is found for Subscriber B's new Local Service Provider (SPA2).

(Step 2-5)—The Signal Transfer Point (STP) sends the query response to the Local Service Provider (LSP1) End Office (EO2); 445-210-1111. An SPA classmark is added to call associated data indicating that the dialing information is from the External Local Number Portability Database (LNP DB).

(Step 2-6)—The Local Service Provider (LSP2) End Office (EO2) translates the call using the new digits (i.e., 445-210-1111) and the SPA classmark, and routes the call to Subscriber B's End Office (EO1). (The routing may be by Multi-frequency (MF) or (Integrated Systems Digital Interface (ISDN) User Part (ISUP)).

(Step 2-7)—Local Service Provider (LSP2) End Office (EO1) completes the call to Subscriber B.

Figure 3:
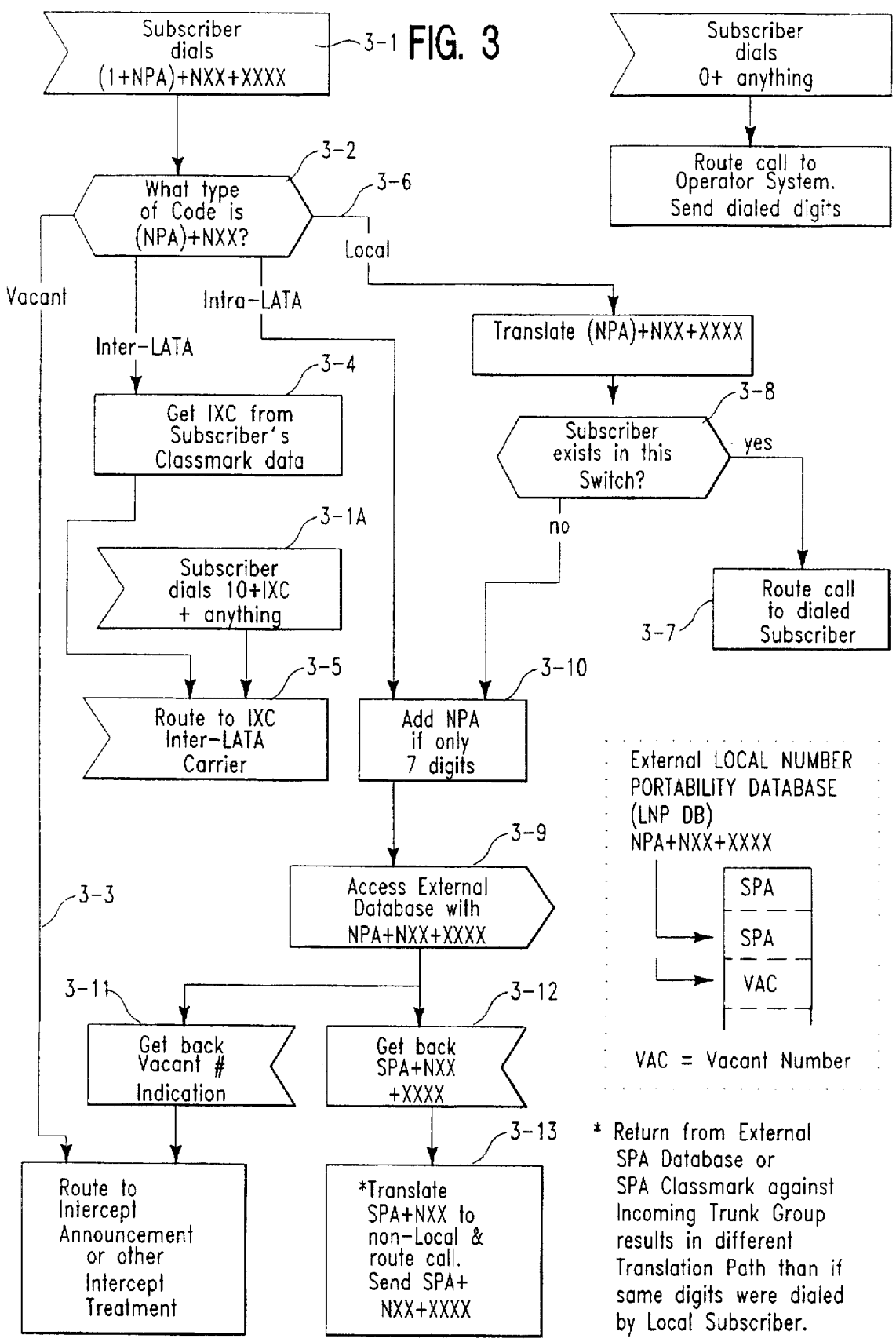
FIG. 3 is a flow diagram showing the process of routing a call to the Subscriber according to the invention.

Considering the method in more detail, and referring now to FIG. 3, Subscriber, A, subscribed to one Local Service Provider, here for example, Local Service Provider LSP2 calls Subscriber, B, subscribed to a different Local Service Provider, here for example LSP3 (Step 3-1). Further, in this example, both service providers LSP2, LSP3 provide service within a common Numbering Plan Area (NPA), here for example NPA1. The called Subscriber B in this example has an assigned directory number, $(NXX-XXXX)_5$, where N is any digit except 0 or 1 and X refers to any one of 10 digits.

Further, in this example, the called Subscriber was originally assigned to the Numbering Plan Area (NPA) code NPA1. As noted above, External Local Number Portability Database (LNP DB) is provided for storing a relationship between each NXX-XXXX directory number assigned to Subscribers within the common Numbering Plan Area (NPA) and a Local Service Provider area code, SPA, associated with the directory number, where:

SPA is a three digit designation code assigned to each one of the Local Service Providers within a common Numbering Plan Area (NPA), each one of the Local Service Providers being assigned a different Local Service Provider area (SPA) code in the common Numbering Plan Area (NPA); and, NXX is a three digit designation code representative of a local exchange area within the common Numbering Plan Area (NPA).

For example, the following TABLE II illustrates an exemplary External Local Number Portability Database (LNP DB):

TABLE II

| Directory Number | Service Provider Area (SPA) Code | Vacant (YES/NO) |
| --- | --- | --- |
| $NPA_1-NXX-(XXXX)_1$ | $SPA_{15}$ | NO |
| $NPA_1-NXX-(XXXX)_5$ | $SPA_5$ | NO |
| $NPA_1-NXX-(XXXX)_7$ | $NPA_5$ | |
| $NPA_1-NXX-(XXXX)_9$ | $SPA_{10}$ | |
| $NPA_1-NXX-(XXXX)_{11}$ | $SPA_{20}$ | |
| $NPA_1-NXX-(XXXX)_{12}$ | $SPA_5$ | |
| . | . | |
| . | . | |
| $NPA_1-NXX-(XXXX)_n$ | $SPA_{20}$ | NO |

Thus, in this example, the calling Subscriber dials either: $(NXX-XXXX)_5$ (i.e., a local call);

1-$(NXX-XXXX)_5$ (i.e., a local call, albeit a potential toll call depending on the type of service subscribed to by the calling Subscriber);

1-NPA-$(NXX-XXXX)_5$ (i.e., an Inter-NPA/Intra-LATA call or an Inter-LATA call); or, 10-IXC-NPA-$(NXX-XXXX)_5$ (i.e., an Inter-LATA call made to a specified Inter Exchange Carrier (IXC). (Step 3-1A).

As shown in FIG. 3, in response to the dialing by the calling Subscriber (Step 3-1), a determination is made by the local switch as to the type of call being placed: i.e., an Inter-LATA call, an Intra-LATA call, a vacant call (i.e., an NXX code which has not been assigned) or a local call (Step 3-2). If the call is a vacant call, it is routed to an intercept "function", and a prerecorded message would be played to the calling Subscriber indicating that the called number is, for example, not a working number. (Step 3-3). If the call is an Inter-LATA call, the Inter Exchange Carrier (IXC) is determined and the call is routed to the Subscriber's Inter-LATA carrier. If the caller dials 10-IXC-anything, the call is routed to the designated Inter-LATA Carrier designated by the dialed IXC three digits following "10" (Steps 3-4, 3-5). If the call is a local call, a translation operation (to be described in detail in connection with FIG. 4 below) is performed on the dialed number, which is, in this example, either: $(NPA)_1-(NXX-XXXX)_5$ or $(NXX-XXXX)_5$, the local switch code, NXX is detected and, therefore, the call is routed to the Subscriber via the four digit line code $(XXXX)_5$. (Step 3-6). The search is performed by a database internal to the local switch; more particularly in a translator to be described in connection with FIG. 4, below). If the so called Subscriber XXXX is populated in the internal database, i.e. has not changed) the call is routed to a line connected to the switch and the B Subscriber receives ringing. (Step 3-7). If the called Subscriber is not a Subscriber to the local switch, (Step 3-8) the dialed number is used as an input (i.e., address) to the External Local Number Portability Database (LNP DB) (Step 3-9). It is noted that the External Local Number Portability Database (LNP DB) is addressed with ten digit numbers; therefore, if the dialed number is (NXX-XXXX)$_5$, the Numbering Plan Area (NPA) code is added to form the address (Step 3-10), in this example, (NPA)$_1$-(NXX-XXXX)$_5$; whereas if the dialed number were (NPA)$_1$-(NXX-XXXX)$_5$ no additional digits need be added to form the External Local Number Portability Database (LNP DB) address.

In response to the accessing (i.e., addressing) the External Local Number Portability Database (LNP DB), two possible responses may be obtained: either the dialed number is vacant, in which case an appropriate prerecorded message is played to the calling Subscriber (Step 3-11); or, the number obtained from the External Local Number Portability Database (LNP DB) at the address is retrieved (Step 3-12) and translated (FIG. 4) by the local translator (FIG. 4) for routing as if the number dialed was (SPA)$_5$-(NXX-XXXX)$_5$ instead of either: (NPA)$_1$-(NXX-XXXX)$_{51}$ or (NXX-XXXX)$_5$. (Step 3-13). If the Subscriber is in the External Local Number Portability Database (LNP DB), the SPA classmark is added indicating that the dialing information has been retrieved from the External Local Number Portability Database (LNP DB).

It should be noted that telephone calls into a switch may come from a source other than from a dialed telephone connected to that switch. For example, the call may come in on a trunk from another switch without a Service Provider Area (SPA) classmark, or from a trunk with a Service Provider Area (SPA) classmark. The former case is described in FIG. 5 (Step 5-1); the later case is described in FIG. 6 (Step 6-1), an indication is provided as follows: If, as in the former case, the number received at the local switch is from a trunk without an SPA classmark, (i.e., in this example the local switch receives either: (NPA)$_1$-(NXX-XXXX)$_5$, or (NXX-XXXX)$_5$) it is processed the same way a call dialed to the local switch is processed as described above in connection with Step 3-2 in FIG. 3. If, on the other hand, the call to the local switch is from a trunk with the SPA classmark, a determination is made in the local switch's internal database as to whether the call is to a Subscriber of the local switch (Step 6-2). If the call is not to a Subscriber to the local switch, the call is merely routed to the appropriate service provider and switch based on the (SPA)$_5$-(NXX-XXXX)$_5$ received. (Step 6-3). On the other hand, if the call is to a Subscriber of the local switch, the Subscriber Provider Code (SPA) three digit prefix is replaced with the local Numbering Plan Area (NPA) code; or, if the call does not have such three digit prefix but is merely (NXX-XXXX)$_{51}$ the local Numbering Plan Area (NPA) code is added to form a ten digit number (Step 6-4) and the process continues as discussed above in connection with FIG. 3 at Step 3-8, except that if the Subscriber does not exist in the internal database of the switch and has an SPA classmark, a database inconsistency exists (Step 6-5). Inconsistency resolution is described hereinafter.

Figure 4:
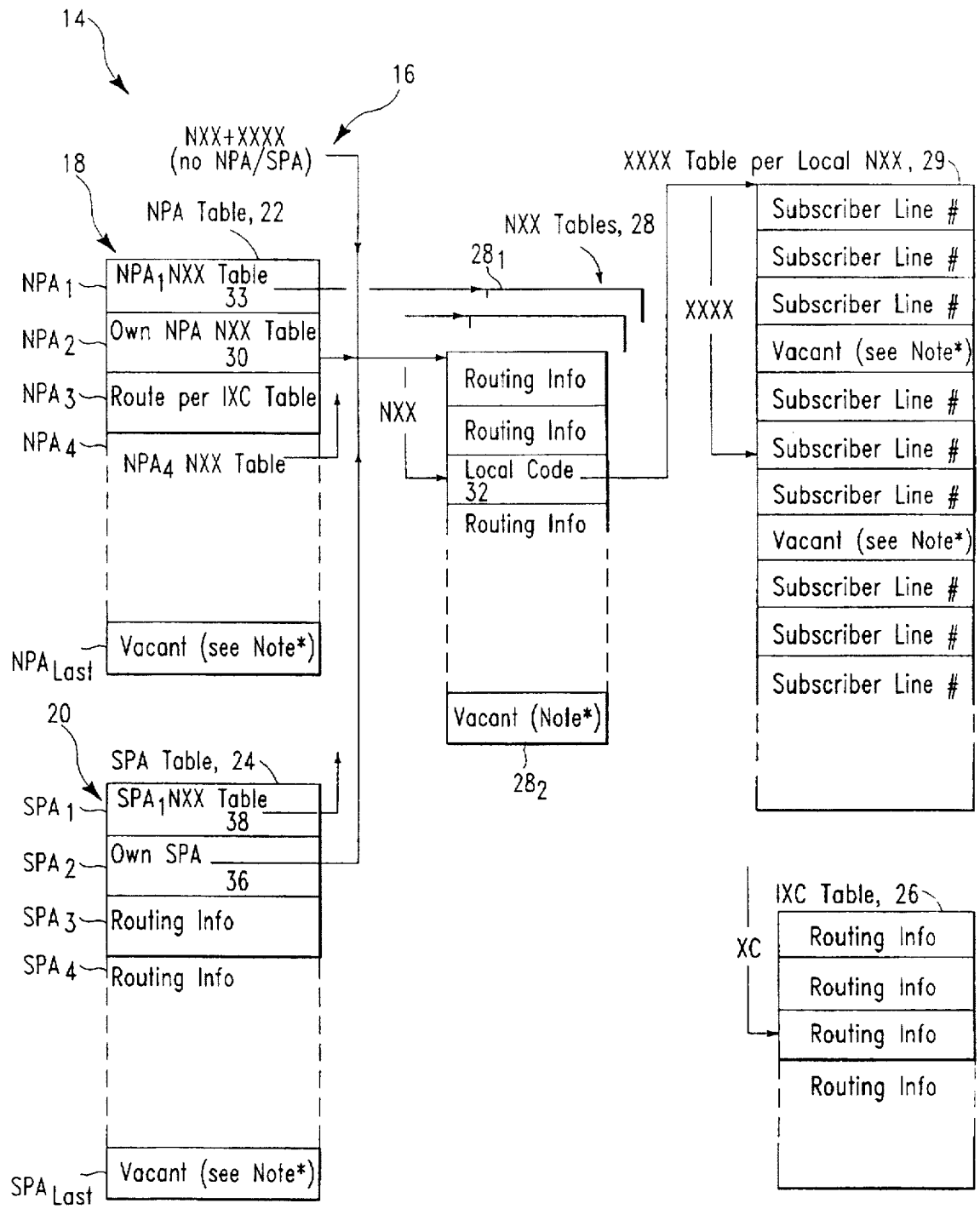
FIG. 4 is a schematic diagram of a translator used in a local switch and adapted to route calls to the Subscriber in accordance with the invention.
Figure 5:
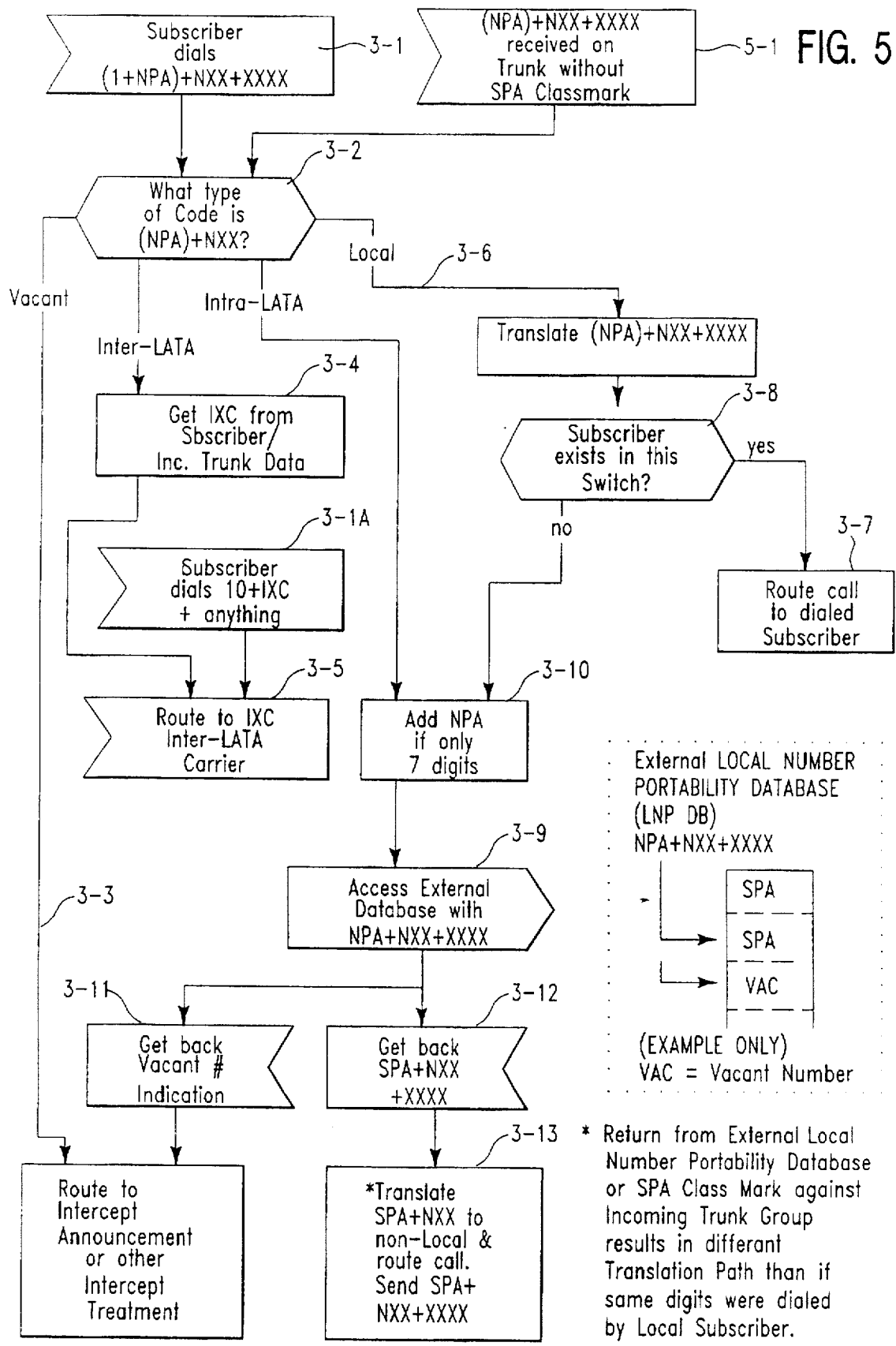
FIGS. 5–11 are flow diagrams useful in showing the process of routing a call to the Subscriber according to the invention.
Figure 6:
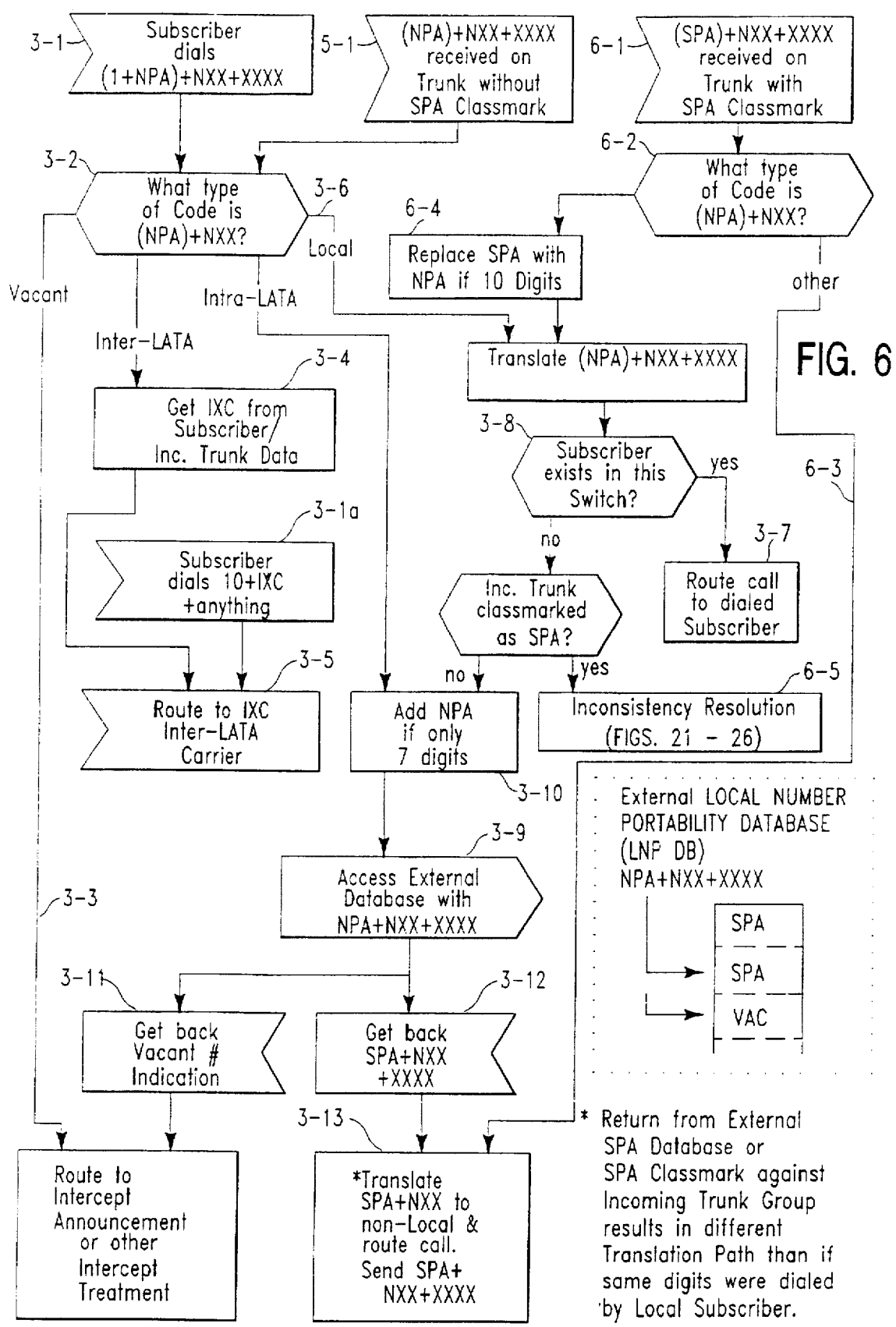

Referring now to FIG. 4, a local translator 14 is shown for preforming the translate operations described in connection with FIGS. 3, 5, and 6 above. The local translator, here at an End Office (EO) switch, or "exchange", NXX, receives dialing information of three different types: local, seven digit (NXX-XXXX) dialing information 16; or, ten digit dialing information; either the ten digit dialing information may be prefixed with either a Numbering Plan Area (NPA) code prefixed (NPA-NXX-XXXX) dialing information 18, or a Service Provider Area (SPA) code prefixed (SPA-NXX-XXXX) dialing information 20. The local translator 14 includes: a Number Area Plan (NPA) code Table 22; a Service Provider Area (SPA) code Table 24; an Inter Exchange Carrier (IXC) Table 26; and a plurality of NXX Tables 28, one NXX Table for each Numbering Plan Area (NPA) code (i.e., NXX Tables 28$_1$–28$_{LAST}$ of NXX Table 28 corresponding to NPA codes NPA$_1$–NPA$_{LAST}$, respectively; and, an XXXX Table 29 for each local NXX. The Number Area Plan (NPA) code Table 22 has routing information for each one of the Numbering Plan Area codes (NPA$_1$–NPA$_{LAST}$) or a pointer to an NXX Table for further information. The Service Provider Area (SPA) code Table 24 has routing information for each one of the Service Provider Area codes (SPA$_1$–SPA$_{LAST}$) or a pointer to an NXX Table for further information. The Inter Exchange Carrier (IXC) Table 26 has the routing information for each Inter Exchange Carrier (IXC). Each of the plurality of NXX Tables 28, has routing information per exchange code and provides finer granularity than NPA and SPA Tables as needed. For calls terminating in the Own switch the Own NXX points to the XXXX Table to find the Subscriber line.

As noted above, the dialing information to the local switch, NXX, may enter from either a locally connected subscriber or a trunk group. Further, the incoming dialing information on a trunk will have an SPA classmark if the received digits were already translated via the External Local Number Portability Database (LNP DB). Thus, if the incoming call has an SPA classmark it is sent to the SPA Table 20, if it is only a seven digit number (i.e., NXX-XXXX) it is sent to the NXX Tables 28 with the local NPA; otherwise, it is sent to the NPA Table 16. The local translator 14, more particularly the NXX Tables 28, in turn, either routes the call to another trunk group or to a connected Subscriber via translation in the XXXX Table.

More particularly, the Numbering Plan Area (NPA) Table 18 includes routing information included within sub-tables (NPA1–NPA$_{LAST}$) thereof for routing incoming calls to the appropriate (i.e., corresponding) one of the plurality of NXX Tables 28. For example, assume that the local switch translator is in Numbering Plan Area (NPA2). If an incoming call to the local translator 14 has a NPA$_2$-NXX-XXXX designation, (i.e., no SPA classmark) the "OWN NPA-NXX TABLE" 30 provides the routing information to direct the call to the "LOCAL CODE" section 32 of the NXX Table corresponding to NPA$_2$, which, in turn, provides the routing information to direct the call to the Subscriber line XXXX (via the XXXX Table 29) indicated by the last four digit. If the incoming call had an NPA$_1$ three digit prefix, the call would be routed to the "NPA$_1$-NXX TABLE" which provides routing information for routing to the NPA$_1$ Table of the NXX Tables 28, which then, in turn, provides routing information to the appropriate trunk group. (It should be noted that, in this example, incoming calls to with an NPA$_3$ prefix are to be routed the IXC Table 26 for further routing information).

The Service Provider Area (SPA) Table 24, like the NPA Table 18, includes routing information included within sub-tables (SPA$_1$–SPA$_{LAST}$) thereof for routing incoming calls to the appropriate (i.e., corresponding) one of the plurality of NXX Tables 28$_1$–28$_{LAST}$, respectively; here, however, for routing incoming calls which have been routed through the External Local Number Portability Database (LNP DB); that is, for calls having the SPA classmark. For example, assume that the local switch translator 14 is in Service Provider Area (SPA2). If an incoming call to the local switch translator 14 has a SPA$_2$-NXX-XXXX designation and an SPA classmark, the "OWN SPA-NXX TABLE" 36 provides routing information to direct the call to the "LOCAL CODE" section 32 of the NXX Table 28 corresponding to SPA$_2$, and which, in turn, provides routing information to direct the call to the Subscriber line XXXX (via XXXX Table 29) indicated by the last four digits, XXXX. If the incoming call had an SPA$_1$ three digit prefix, the call would be routed to the "SPA$_1$-NXX TABLE" 38 which provides routing information to route to the SPA$_1$ Table 28$_1$ of the NXX Tables 28, which then, in turn, provides routing information to route to the appropriate trunk group. (It should be noted that, in this example, incoming calls with an SPA$_3$ prefix are to be routed to the trunk group specified for SPA$_3$ in the Routing Information).

If the incoming call has only a seven digit designation, NXX-XXXX (i.e., as shown at 16), it is recognized by the local switch translator 14 as a call within the Own NPA or Own SPA based on the absence or presence of the SPA classmark. The call is translated accordingly.

Figure 7:
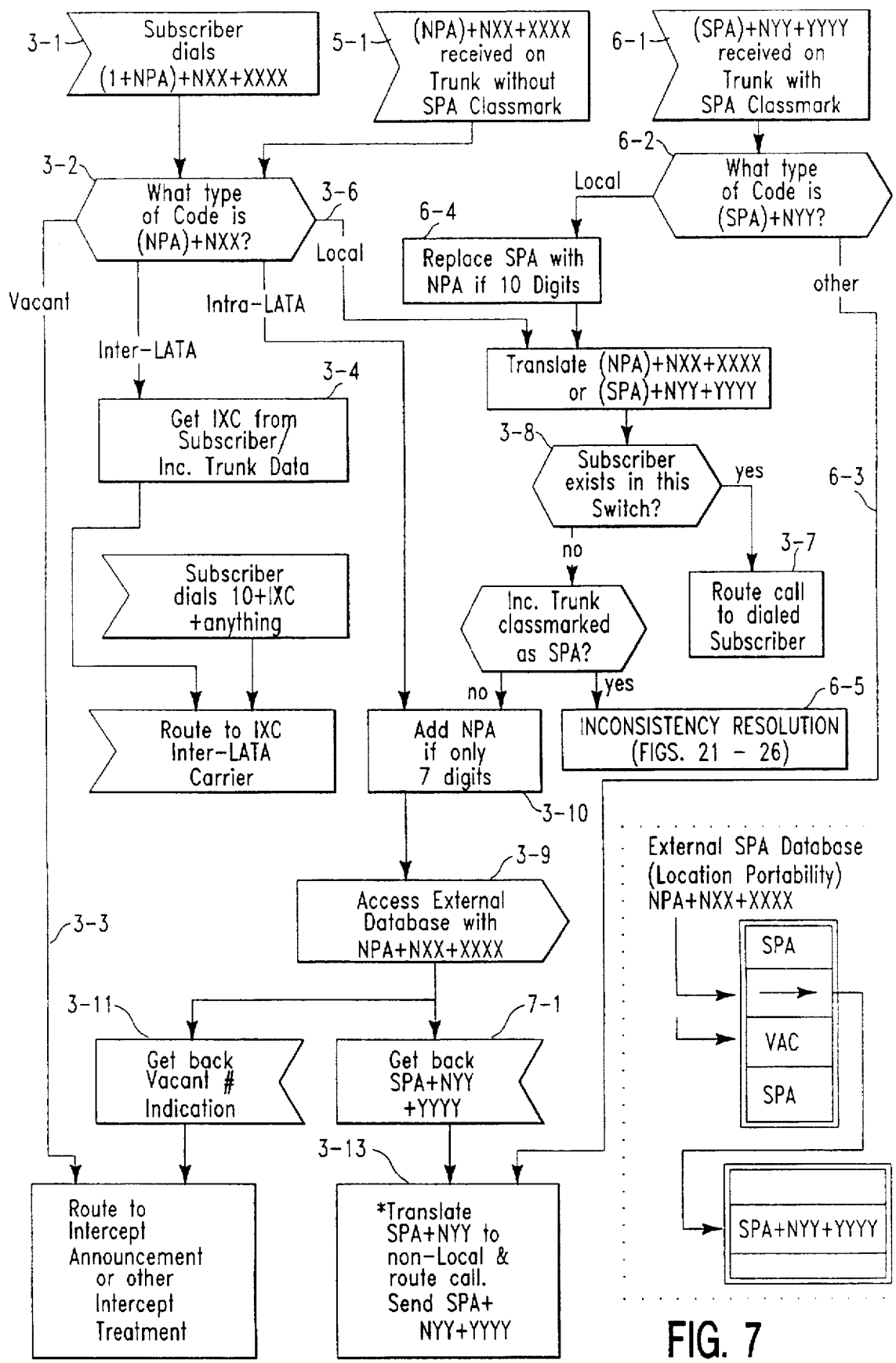

Referring now to FIG. 7, an example is described where a Subscriber has changed to a different Local Service Provider and has also moved to a different geographical location and is no longer connected to any switch, or exchange, having the NXX switch designation; that is, the Subscriber wishes Location/Geographic Portability. More particularly, in this example, the Subscriber is now connected to a switch having the designation NYY, where Y is any digit from 0 to 9. Thus, while the Subscriber is in the same Numbering Plan Area (NPA), the Subscriber is now connected to a different switch and serviced by a different Local Service Provider and wishes to retain the same directory number (DN), here, for example, NXX-XXXX. The External Local Number Portability Database (LNP DB) will be updated to contain this relationship (i.e., NPA-NXX-XXXX is now at SPA-NYY-YYYY). For this case, the External Local Number Portability Database (LNP DB) also needs to store the NYY-YYYY in addition to the SPA. Thus, when the External Local Number Portability Database (LNP DB) is accessed, it returns SPA-NYY-YYYY. Routing is done the same as described above when a Subscriber changes Local Service Provider (SPA), i.e., by translating the SPA-NYY. The NYY will not be dialed by any Subscriber but will be used as a routing code as described above for ported numbers when a Subscriber changes Local Service Provider (SPA). Thus, the NYY need not necessarily be restricted to the NXX format but rather, could use codes such as 010, 001, etc., for example. The ported Subscribers are assigned the NYY-YYYY codes to pack the NYY code with consecutive numbers. Only one NYY code should be required per large office accepting ported Subscribers. Smaller end offices may share NYY codes divided among thousands of blocks. Only the SPA-NYY-YYYY need be forwarded via the tandem office to the terminating office. The SPA-NYY combination allows tandem switches to use AIN triggers to separate traffic along Local Service Provider (SPA) lines as well as separating out ported numbers.

Since, as noted above, the Subscribers are assigned NYY-YYYY codes with successive numbers, the terminating switch can translate the SPA-NYY-YYYY back to an NPA-NXXXXXX easily since there need be no holes, or vacancies, in the block of numbers. For calls originating in the switch which contains ported Subscribers, a call to the Own NXXs will translate as normally to route locally, or if a vacant number is encountered the External Local Number Portability Database (LNP DB) is consulted for proper routing. For calls to non-local NXXs the External Local Number Portability Database (LNP DB) is queried if that NXX supports number portability of any type. The returned SPA-NYY may be the local code for ported numbers and the call is completed locally.

For example, again, the call may come in as either: a dialed call (i.e., as either: 1-NPA-NXX-XXXX; or NPA-NXX-XXXX; or NXX-XXXX) (Step 3-1); from a trunk without an SPA classmark (i.e., as either: NXX-XXXX, or, NPA-NXX-XXXX) (Step 3-5); or, from a trunk with an SPA classmark (i.e., as either NYY-YYYY, or, SPA-NYY-YYYY) (Step 6-1). In all cases, the processing is the same as that described above in connection with FIGS. 3, 5 and 6; here, however, the number returned by the External Local Number Database (LNP DB) is SPA-NYY-YYYY (Step 7-1) for routing as described above in connection with Step 3-13 of FIG. 3.

Figure 8:
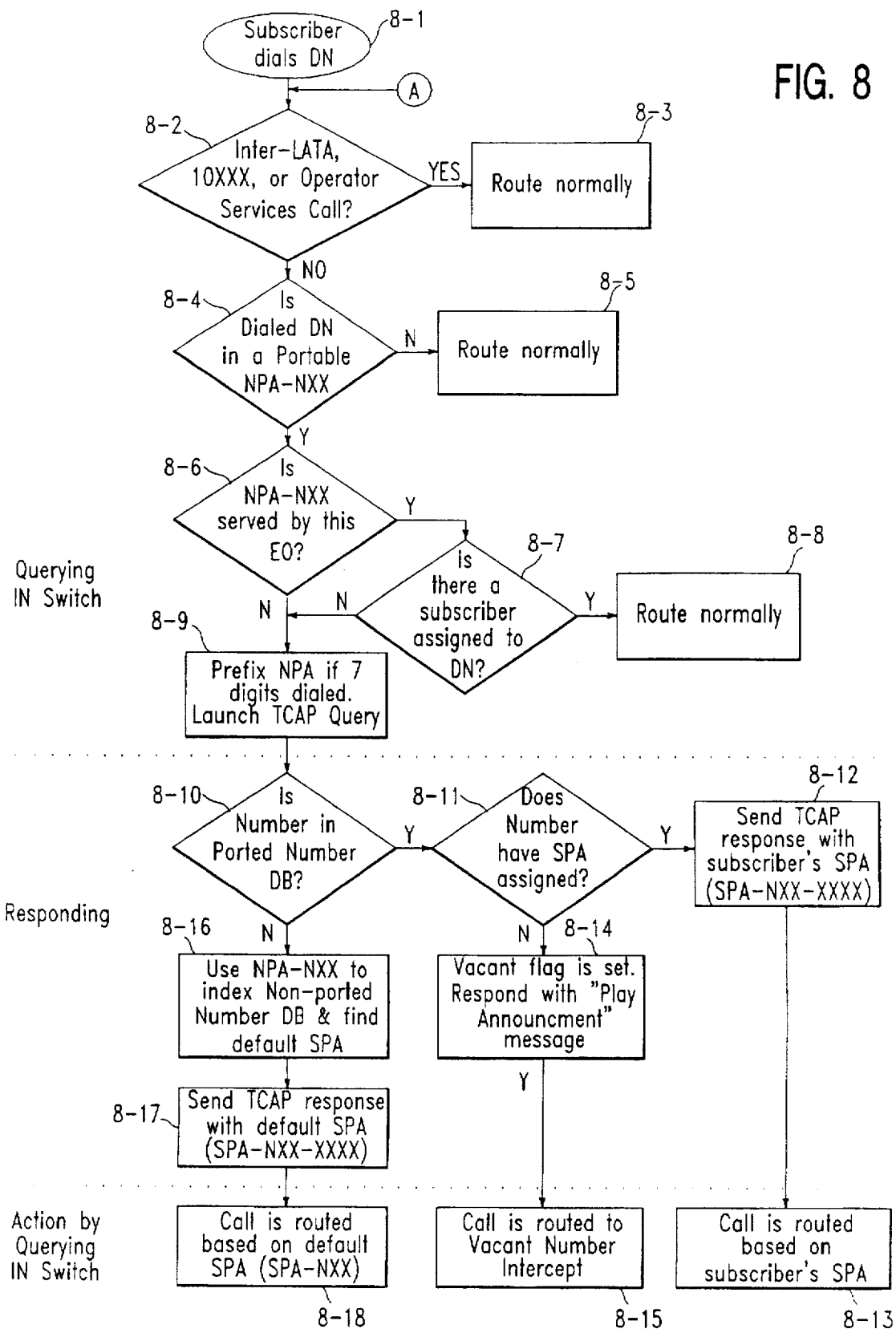
Figure 9:
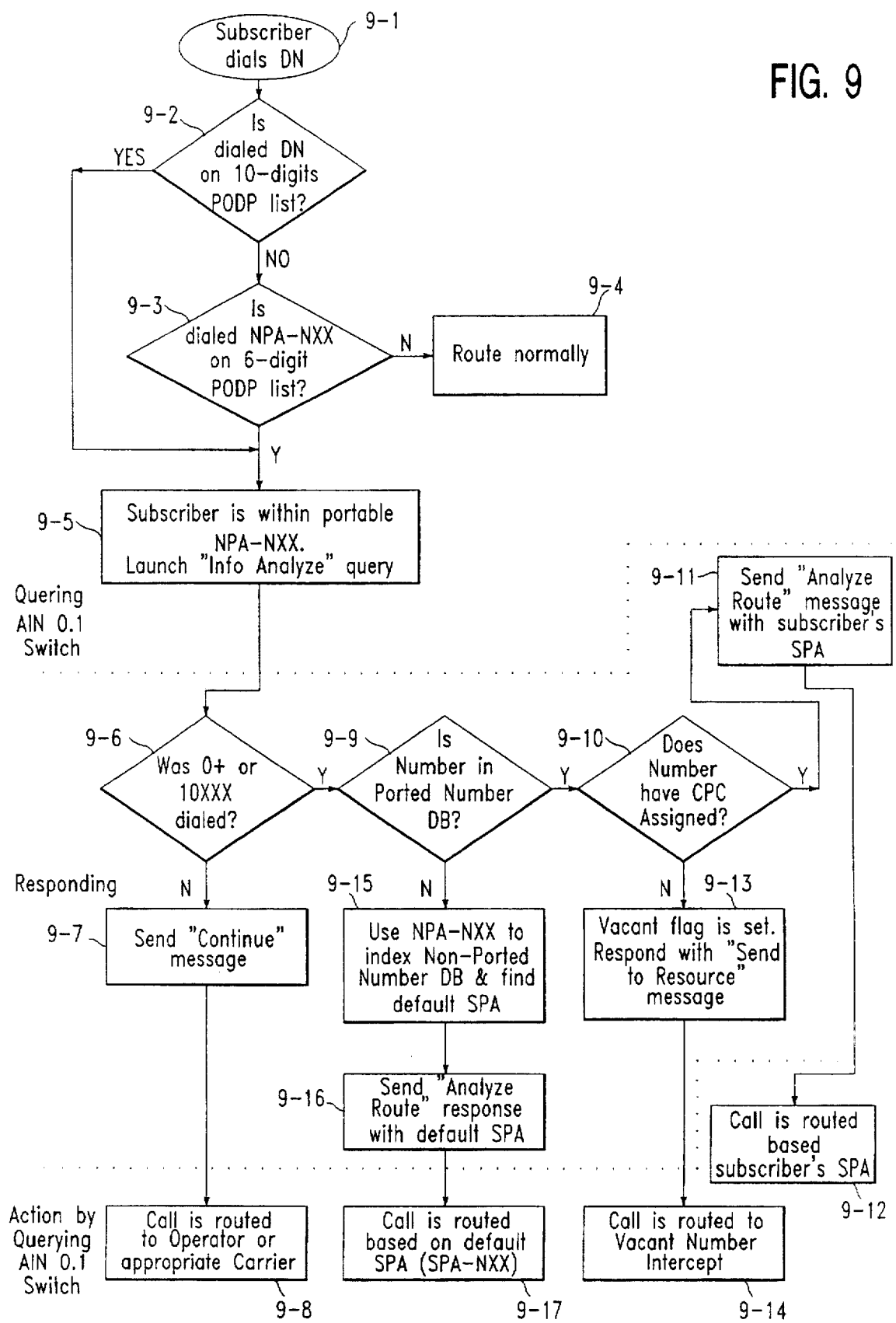
Figure 10:
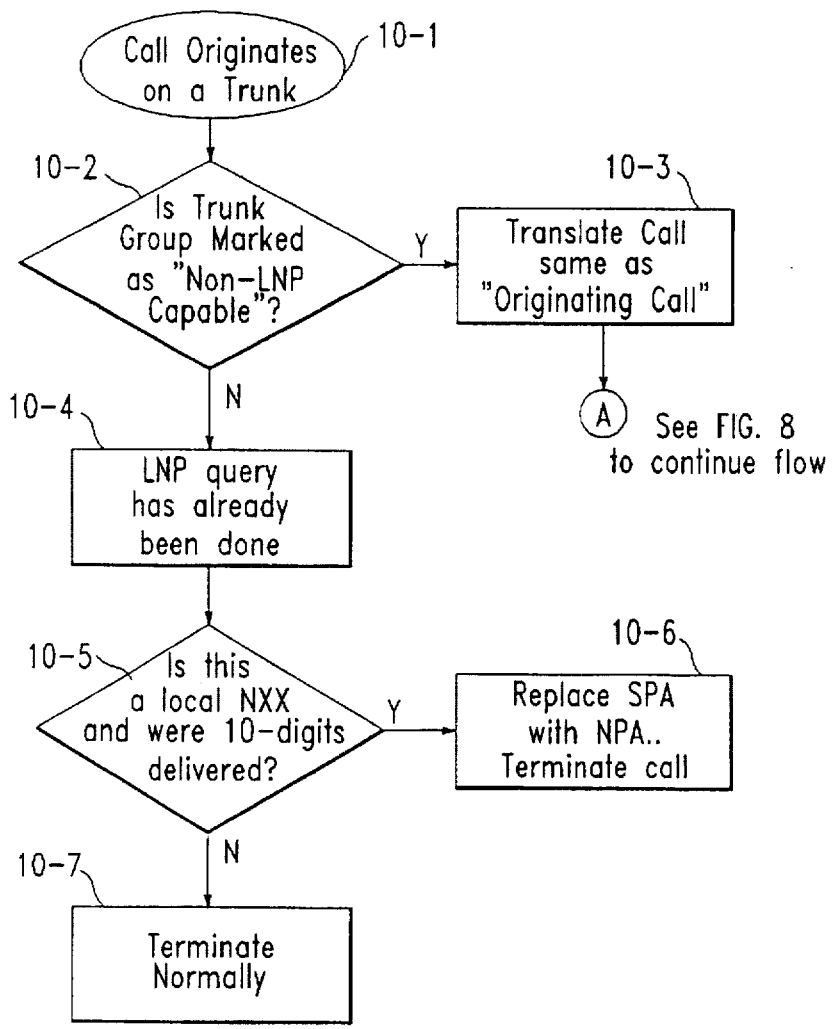

Referring now to FIGS. 8, 9 and 10 the call processing logic for originating calls using Intelligent Network (IN) and Advanced Intelligent Network (AIN) triggers, and for incoming calls, respectively, is shown. FIG. 8 illustrates the flow for an originating call using an Intelligent Network (IN) Trigger. When a Subscriber makes a call (Step 8-1), the following events occur:

- the serving end office first determines whether the call is an Inter-Local Access and Transport Area (LATA) call made via 1-, or, 10-XXX-dialing, or a call requiring operator Services (Step 8-2).
- if it is either of the above, the call is routed to the appropriate carrier or operator services switch, using current methods (Step 8-3).
- if the call is neither an Inter-Local Access and Transport Area (LATA) nor an Operator Services call, the end office determines whether the dialed destination is within a portable NXX by checking its own internal database (i.e., the local translator, a database internal to the local switch as distinguished from the External Local Number Portability Database (LNP DB) using the digit translation functions of the switch (Step 8-4).
- if the dialed number is not within an NXX that is marked as portable, the call is routed normally (Step 8-5).
- if the dialed number is within a portable NXX, another check of the switches internal database determines whether the NXX is served locally (Step 8-6).
- if the NXX is local (i.e., the office serves Subscribers in that NXX), the office attempts to translate the number to a Subscriber (Step 8-7).
- if the Subscriber is served by the local office, the call is an intra-switch call and is routed normally (Step 8-8).
- if the local office does not provide service for the dialed directory number, the end office prefixes the NPA (if only 7 digits were dialed) and launches a Transaction Capabilities Application Part (TCAP) query (with NPA-NXX-XXXX) to the External Local Number Portability Database (LNP DB) to determine how to route the call (Step 8-9).
- the Service Control Point (SCP) checks the Ported Number portion of the External Local Number Portability Database (LNP DB) (to be described below in connection with TABLE III) for an entry of the dialed number (Step 8-10).
- if an entry is found, and the number has a corresponding Service Provider Area (SPA) Code (Step 8-11), a Transaction Capabilities Application Part (TCAP) response containing the Service Provider Area (SPA) Code NXX-XXXX) is sent back to the querying office (Step 8-12).

the end office then routes the call based on the routing number (Service Provider Area (SPA) Code-NXX-XXXX) in the Transaction Capabilities Application Part (TCAP) response (Step 8-13).

if an entry for the number exists, but the vacant flag is set, the number is vacant, and the Service Control Point (SCP) responds with the Play Announcement message (Step 8-14).

the end office then routes the call to vacant number intercept (Step 8-15).

if the number was not found in the Ported Number portion of the External Local Number Portability Database (LNP DB) (i.e., TABLE III, below), the Service Control Point (SCP) uses the NPA-NXX of the number to index into the Non-Ported Number portion of the External Local Portability Database (LPN DB) (to be described below in connection with TABLE IV) to retrieve the default Service Provider Area (SPA) Code (i.e., the current Local Service Provider's Service Provider Area (SPA) Code) (Step 8-16).

the Service Control Point (SCP) then sends the routing number (Service Provider Area (SPA) Code-NXX-XXXX) to the querying office in a Transaction Capabilities Application Part (TCAP) response (Step 8-17), and the call is routed by the end office based on the returned routing number (Step 8-18).

FIG. 9 depicts the flow for an originating call from a switch using the Advanced Intelligent Network (AIN) 0.1 protocol. When a Subscriber makes a call (Step 9-1), the following sequence of events occurs:

the serving end office compares the dialed digits to the ten digit Public Office Dialing Plan (PODP) director number (DN) list (Step 9-2). (It should be noted that the Public Office Dialing Plan (PODP) is the part of the internal database of the local switch). If the dialed number is found, the end office sends an Advanced Intelligent Network (AIN) 0.1 InfoAnalyzed message to the External Local Number Portability Database (LNP DB) (Step 9-5).

if an entry is not found in the ten digit Public Office Dialing Plan (PODP) Directory Number (DN) list, the serving office then compares the NPA-NXX to the six digit Public Office Dialing Plan Directory Number (DN) list (Step 9-3). If an entry is found, the end office launches an Advanced Intelligent Network (AIN) 0.1 InfoAnalyzed query to the External Local Number Portability Database (LNP DB) (Step 9-5).

if an entry is not found, the number is not within a portable NXX, and the call is routed normally (Step 9-4).

upon receipt of the InfoAnalyzed message, the Service Control Point (SCP) determines whether the call was made via 0-, or, 10-XXX-dialing. If so, the Service Control Point (SCP) sends a Continue message to the querying office with the dialed digits unchanged (Step 9-7), and the call is routed to the Operator Services switch or the appropriate carrier (Step 9-8).

if 0-, or, 10-XXX- was not dialed, the Service Control Point (SCP) checks the Ported Number portion of the External Local Number Portability Database (LNP DB) (i.e., TABLE III, below) for an entry of the dialed number (Step 9-9). If an entry is found, and the number has a corresponding Service Provider Area (SPA) Code (Step 9-10), an AnalyzeRoute message containing the Service Provider Area (SPA) Code (SPA-NXX-XXXX) is sent back to the querying office (Step 9-11).

the end office then routes the call based on the routing number in the AnalyzeRoute message (SPA-NXX-XXXX) (Step 9-12).

if an entry in the Ported Number (portion of the External Local Number Portability Database (LNP DB) (i.e., TABLE III, below), but the vacant flag is set, the number is vacant and the Service Control Point (SCP) responds with the SendToResource message (Step 9-13)

The end office then routes the call to vacant number intercept (Step 9-14).

if the number was not found in the Ported Number portion of the External Number Portability Database (LNP DB) (i.e., TABLE III, below), the Service Control Point (SCP) uses the NPA-NXX of the number to index into the Non-Ported Number portion of the External Local Number Portability Database (LNP DB) (i.e., TABLE IV, below) to retrieve the default Service Provider Area (SPA) Code (i.e., the current service provider's Service Provider Area (SPA) Code) (Step 9-15).

the Service Control Point (SCP) then sends the routing number (SPA-NXX-XXXX) to the querying office in an AnalyzeRoute message (Step 9-16), and the call is routed by the end office based on the returned routing number (Step 9-17).

FIG. 10 depicts an incoming call using the Transaction Capabilities Application Part (TCAP) 800 Intelligent Network (IN) trigger. Routing proceeds as follows:

When a call is received on a trunk (Step 10-1), the end office uses the presence or absence of the SPA classmark against the incoming trunk to determine whether the call is from an Local Number Portability (LNP)-capable end office or a Local Number Portability (LNP) non-capable end office (Step 10-2)

A call received on a "LNP non-capable" trunk group is treated the same as a local origination (Step 10-3), and follows the sequence shown in FIG. 8.

If the call is received on an "Local Number Portability (LNP)-capable" trunk group, then the switch presumes the External Local Number Portability Database (LNP DB) query has already been performed (Step 10-4).

If the call terminates to a local NXX (Step 10-5), and 10 digits were delivered (e.g., the end office serves more then one NPA), the Service Provider Area (SPA) Code is replaced by the NPA and the call is terminated to the local Subscriber (Step 10-6). The Service Provider Area (SPA) Code must be replaced by the NPA to ensure features such as Called Number Delivery continue to operate properly, but only when 10 digits are delivered (e.g., the end office serves more than one NPA).

If the NXX is not served by the end office, no substitution takes place, and the call is routed to the proper Local Service Provider using the Service Provider Area (SPA) Code (SPA-NXX-XXXX) and normal local tandem functionality (Step 10-7).

Thus, in summary, when a call is originated to a ported Subscriber, the originating end office (or an Local Number Portability (LNP)-capable end office) will launch a Transaction Capabilities Application Part (TCAP) 800 Intelligent Network (IN) or Advanced Intelligent Network (AIN) 0.1 query to the External Local Number Portability Database (LNP DB) to retrieve the Subscriber's Service Provider Area (SPA) Code. The Local Number Portability (LNP) Service Control Point (SCP) responds with the Service Provider Area (SPA) Code - the last seven digits of the director number of the ported Subscriber. The call will then be routed using existing there or six-digit translations based on the Service Provider Area (SPA) Code and the dialed Exchange/office code (Service Provider Area (SPA) Code - NXX). The Service-Provider Area (SPA) Code is used only to route the call and is completely transparent to the Subscriber.

Naturally, this means that each switch in the portability area must be able to route on Service Provider Area (SPA) Code's just as it currently does on NPAs.

When a non-ported number is received in a Local Number Portability (LNP) query, the Service Control Point (SCP) will simply respond by sending back the default Service Provider Area (SPA) Code for the NPA-NXX plus the dialed number (SPA-NXX-XXXX), and the querying end office will route the call to the current Local Service Provider using existing six digit routing functionality.

From the above, it should be noted that no change to the Transaction Capabilities Application Part (TCAP) 800 Intelligent Network (IN) or Advanced Intelligent Network (AIN) 0.1 protocols is required to query the Service Control Point (SCP). The External Local Number Portability Database (LNP DB) query will only be required when the dialed Intra-Local Access and Transport Area (LATA) number is not in the originating end office switches internal database, (i.e., the local translator described above in connection with FIG. 4) or the NPA-NXX is marked in the originating end office's routing translations as being "portable". An External Local Number Portability Database (LNP DB) query is not required by the originating Local Service Provider using either the Intelligent Network (TR-TSY-000533) or the Advanced Intelligent Network (AIN) 0.1 implementation approach for any of the following calls:

Local terminating calls to numbers that are populated in the switch's local database Any Inter-Local Access and Transport Area (LATA) call type (routed to the carrier)

Calls from Local Number Portability (LNP) capable switches

Calls to unpopulated Centrex intercom numbers

Calls to NPA-NXXs where portability is not allowed

Calls where the dialed number is a SAC code or other special number

The Service Provider Area (SPA) Code can be any three digits between 200–999, with the exception of SAC and N11 codes. The Service Provider Access (SPA) Code need only be unique within the Local Area and Transport Area (LATA) because it is never delivered to an inter-exchange carrier (IXC) by the originated Local Service Provider. Since the Service Provider Area (SPA) Code is in the same format as the NPA, it can be accommodated by either MF or SS7 signaling protocols.

Few variations occur if the incoming trunk call uses an Advanced Intelligent Network (AIN) 0.1 rather than an Intelligent Network (IN) trigger. If a Local Number Portability (LNP) query has already been performed for the call, the number will be delivered as SPA-NXX-XXXX. Because Service Provider Area (SPA) Code values are not entered into the Public Office Dialing Plan Data (PODP) list, the call routes normally. If the call has not yet been translated, the Public Office Dialing Plan (PODP) trigger is hit, and a query is sent to the Service Control Point (SCP) via an Advanced Intelligent Network (AIN) 0.1 InfoAnalyze message. From this point, the routing is identical to that shown in FIG. 8.

For service provider portability, the Service Control Point (SCP) must always return to the querying switch the NXX-XXXX digits delivered in the External Local Number Portability (LNP DB) database query except for Location/Geographic portability where a substitute NYY-YYYY is returned. The Service Control Point (SCP) also replaces the NPA, changing it to a Service Provider Area (SPA) Code Non-ported numbers need not be stored in the External Local Number Portability Database (LNP DB). If the Service Control Point (SCP) cannot locate a 10-digit number in the Ported Number portion of the External Local Number Database (LNP DB) (i.e. TABLE III, below), it will search the Non-Ported Number portion of the External Local Number Database (LNP DB) (i.e. TABLE IV, below) for the default Service Provider Area (SPA) Code using the received NPA-NXX as an index. This Service Provider Area (SPA) Code will identify the current Local Service Provider serving the Subscriber.

In a Local Number Portability (LNP) environment, the NPA-NXX no longer defines the switch serving the Subscriber. To accommodate Transaction Capabilities Application Part (TCAP) queries between switches for CLASS features (e.g., Automatic Recall/Automatic Callback), STPs will be required to perform 10-digit Global Title Translation (GTT) for the NPA-NXXs opened for portability to new Local Service Providers; or else, the originating switch or the first STP which receives such a feature related TCAP message, will first have to query the External Local Number Portability Database (LNP DB) to replace the Number Plan Area (NPA), with an Service Provider Area (SPA) before the actual destination can be determined.

The method does not affect features that use the Calling Subscriber Number and Redirecting number. For calls that involve features that use a previously stored called Subscriber number (e.g., Call Forwarding, Speed Calling), an External Local Number Portability Database (LNP DB) query is necessary to ensure that the current Local Service Provider is used to route the call. Since the query is launched prior to routing the call, a query is not necessary when these features are activated. To ensure that these features work properly on the terminating side, the terminating office must change the Service Provider Area (SPA) Code back to the corresponding NPA prior to handling the call. However, this is only required for those exceptional cases where 10 digits are delivered to the terminating office (i.e., when the switch serves Subscribers in more than one NPA).

The method provides the means to query the External Local Number Portability Database (LNP DB) for both Intra-Local Access and Transport Area (LATA) local and Intra-Local Access and Transport Area (LATA) toll calls using either the Intelligent Network (IN) or Advanced Intelligent Network (AIN) 0.1 protocols. Calls made to Inter-Local Access and Transport Area (LATA) destinations are immediately routed to the appropriate inter-exchange carrier where the External Local Number Portability Database (LNP DB) query will be performed.

The External Local Number Portability Database (LNP DB) is comprised of two data tables, or portions. One portion contains Ported and Vacant Directory Numbers (DNs); the second portion, Non-ported Directory Numbers. When a query is received, the Service Control Point (SCP) first uses all ten digits of the DN to search the External Local Number Portability Database (LNP DB) portion containing only Ported and Vacant directory numbers (DNs).

As TABLE III shows, a successful search of this portion of the External Local Number Portability Database (LNP DB) will retrieve either the Service Provider Area (SPA) Code of the called Subscriber's new Local Service Provider, or it will find that the number is not assigned, and the Local Number Portability (LNP) Service Control Point (SCP) will return vacant number intercept treatment.

TABLE III

Format of Ported Number/Vacant Number Data Table

| Director Number | Service Provider Code | Vacant (Y/N) |
| --- | --- | --- |
| NPA-NXX-XXXX | SPA$_1$ | N |
| NPA-NXX-XXXX | SPA$_2$ | N |
| NPA-NXX-XXXX | — | Y |

If the ten digit number is not found in the Ported/Vacant Number TABLE III, this indicates that the dialed number is within a portable NXX, but has not been ported (i.e., is still served by the incumbent service provider). The Local Number Portability (LNP) Service Control Point (SCP) will search the Non-Ported DN portion of the External Local Number Portability Database (LNP DB) as illustrated in TABLE IV, to determine the Service Provider Area (SPA) Code for the Subscriber.

TABLE IV

Format of Non-Ported Number Data Table

| NPA-NXX | Service Provider Code |
| --- | --- |
| NPA-NXX1 | SPA$_1$ |
| NPA-NXX2 | SPA$_1$ |
| NPA-NXX3 | SPA$_2$ |

This data TABLE IV structure minimizes the number of 10-digit entries by storing only a Service Provider Area (SPA) Code for those Subscribers who have not changed Local Service Providers.

Figure 11:
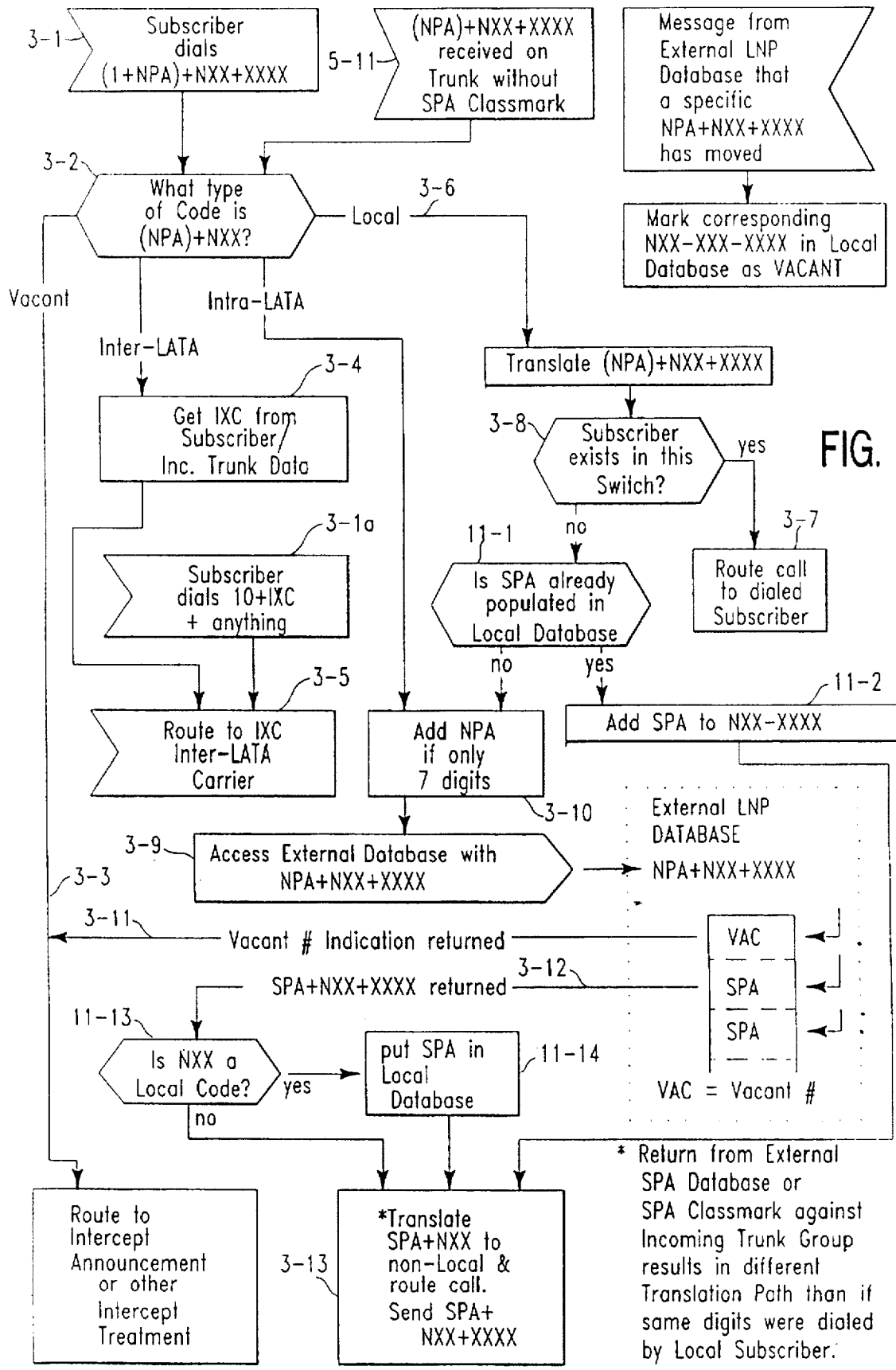

Referring now to FIG. 11, a method is described for reducing the number of accesses, or queries, to the External Local Number Portability Database (LNP DB). The method includes the steps of: determining, from a database of a local switch, whether an incoming call to the local switch is assigned to the switch (as described above in connection with steps 3-1 through 3-8 of FIG. 3), and if not, determining from the External.Local Number Portability Database (LNP DB), a Service Provider Area (SPA) assigned to the called Subscriber; and, populating the database of the local switch for the called subscriber, the SPA determined from the External Local Number Portability Database (LNP DB). Thus, when the Subscriber is called again, the SPA stored in the database of the local switch is added as a three digit prefix to the called parties directory number. Thus, with such method, the External Local Number Portability Database (LNP DB) need not be accessed for calls made to the Subscriber after the database of the local switch has been populated with the Subscriber's SPA.

More particularly, if it is determined in step 3-8 that the Subscriber exists in the internal database of the local switch, the call is routed to the dialed Subscriber, as discussed above in connection with step 3-7 of FIG. 3. If, however, the Subscriber does not exist in the internal database of the local switch, (i.e., the last four digits, XXXX, at the local switch are "vacant"), a determination is made in Step 11-1 at the local switch as to whether the called Subscriber at the XXXX location of the internal database of the local switch has a Service Provider Area (SPA) designation populated therein, in a manner to be described, from a previous query to the External Local Number Portability Database (LNP DB). If the XXXX location in the internal database of the local switch does not have an SPA designation, an NPA is added to the dialed Subscriber number, if needed, as described above in Step 3-10 of FIG. 3, and the External Local Number Portability Database (LNP DB) is accessed as described in Step 3-9 of FIG. 3. If not vacant, the ten digit SPA-NXX-XXXX is retrieved from the External Local Number Portability Database (LNP DB), as described in Step 3-12 of FIG. 3. A determination is made from the retrieved SPA-NXX-XXXX ten digits whether the NXX is a local exchange code (Step 11-13); and, if it is, the SPA code is stored in the internal database of the local switch (Step 11-14). Thus, internal database of the local switch is now populated with the SPA of the called Subscriber. If the SPA-NXX-XXXX is not local to the switch or, if in the local switch and after the SPA is put into the local switch internal database, the call is routed as described above in connection with Step 3-13 of FIG. 3.

Therefore, returning to Step 11-1, if a new call is made to the same Subscriber, and Step 3-8 determines that the Subscriber does not exist in the switch, Step 11-1 will now determine that the called Subscriber has an SPA, which is added to the NXX-XXXX (Step 11-2) and the call is routed as in Step 3-13 discussed above in connection with FIG. 3 without accessing the External Local Number Portability Database (LNP DB). On any subsequent call, if an indication is returned on an ISUP trunk via SS7 signaling, indicating that the dialed number is not located within the terminating switch, the original switch which had routed the call based on its internally stored database, would now access the external database to update its own database to the proper routing.

For routing via trunk groups that do not use ISUP signaling, the following options exist, any of which can be used:

1. Always use the external database.
2. Access the external database to update the internal database for calls which are abandoned without having reached an answered state.
3. Periodically audit the internal database for directory numbers which point to a non-ISUP route.

Figure 12A:
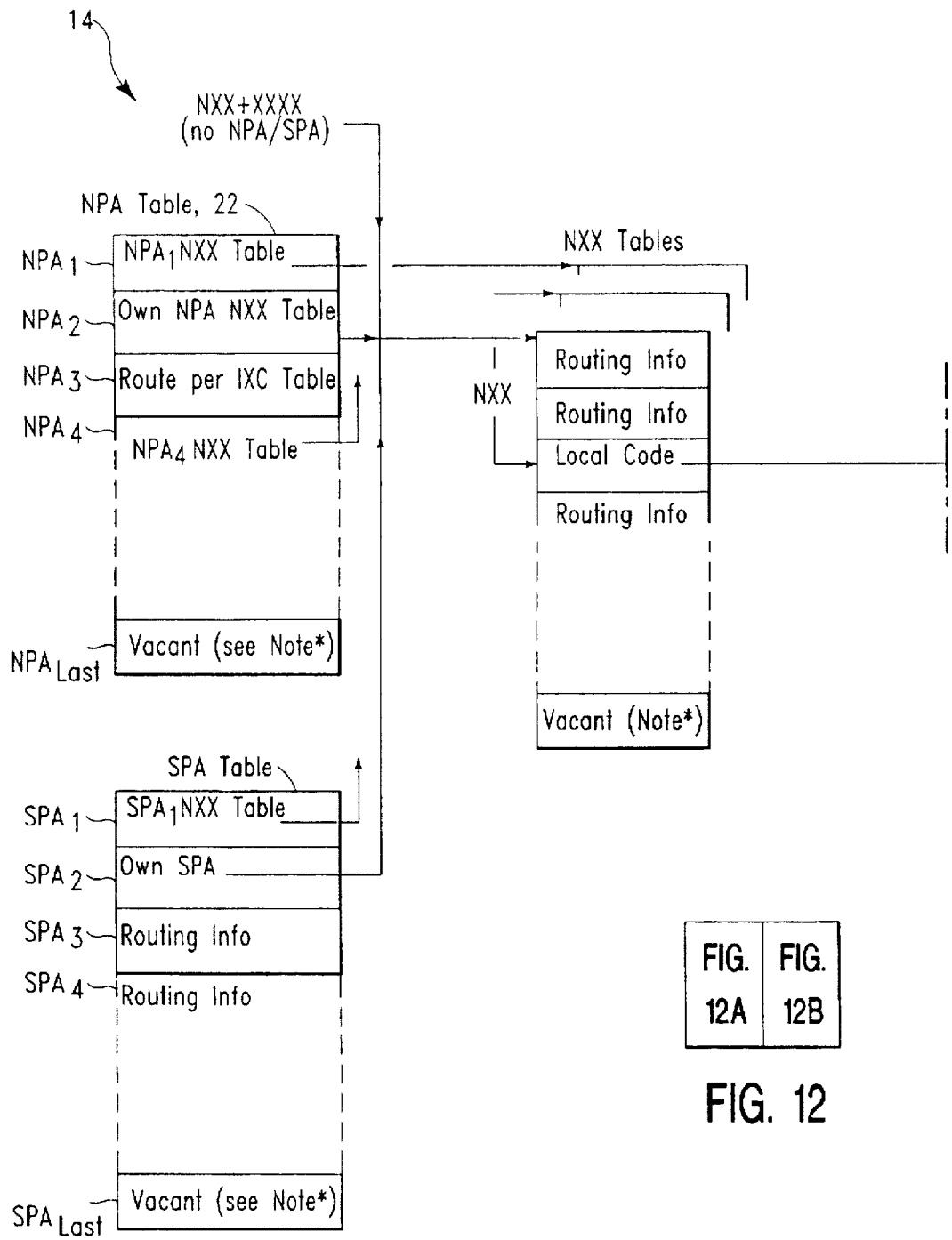
FIG. 12 is a schematic diagram of a translator in accordance with the present invention.
Figure 12A:
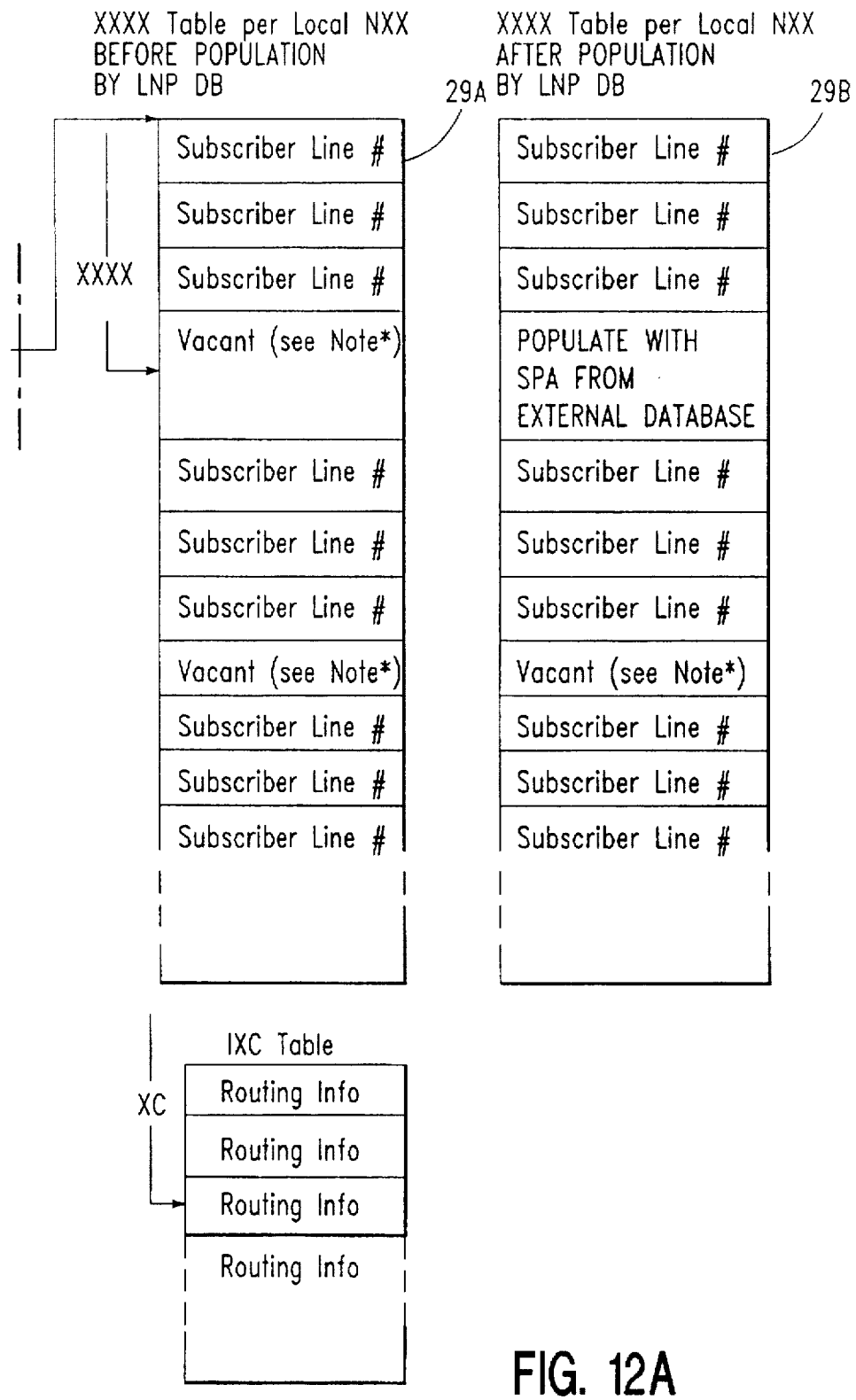

FIG. 12 shows the local switch translator 14 XXXX Table 29A before being updated, i.e., populated with the SPA retrieved from the External Local Number Portability Database (LNP DB) and the XXXX Table 29B after being populated with the SPA retrieved from the External Local Number Portability Database (LNP DB). Thus, as shown, before being populated, XXXX was vacant; however, after accessing the LNP DB, XXXX is populated with the SPA.

Figure 13:
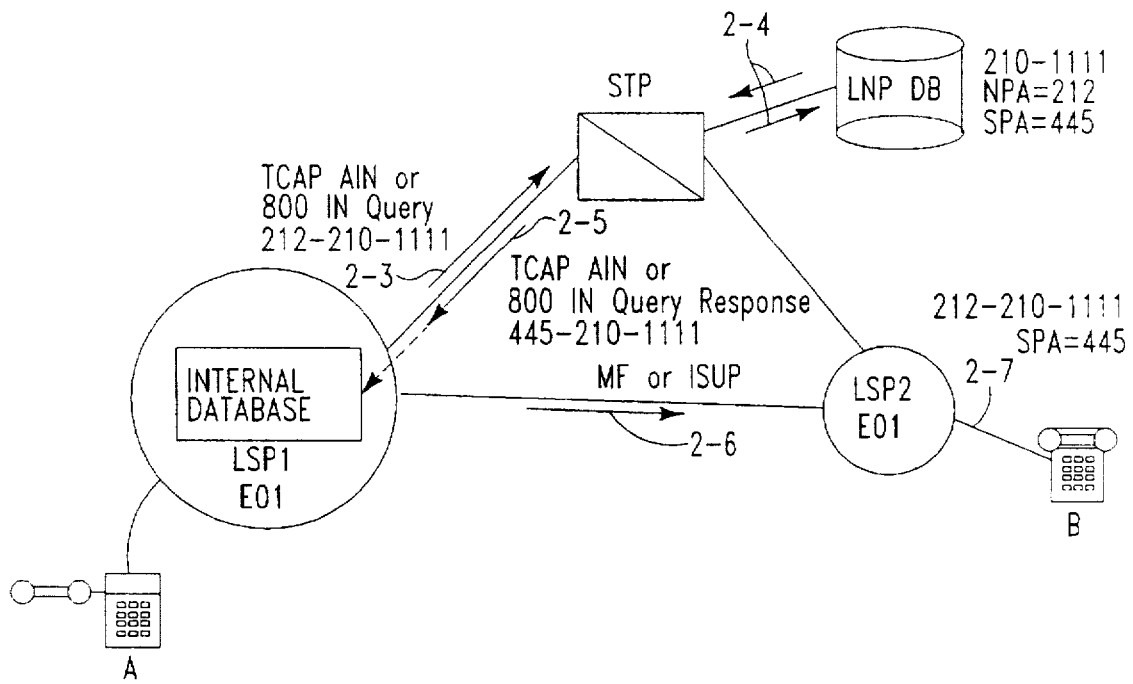
FIGS. 13–17 are schematic diagrams useful in understanding various features of the invention.

Referring now to FIG. 13, the illustration presented above in connection with FIG. 2 is shown; here however, after determining in Step 3-13A discussed in connection with FIG. 13 that the NXX is a local exchange call, the internal database of the local switch is updated with the SPA of the called party as discussed above in connection with FIGS. 11 and 12.

Illustrative Call Scenarios

FIGS. 14-18 use numbers to denote call flow segments. The same numbers appear in parentheses in our text response referring to the corresponding figure. All figures use "broken lines" to depict connectivity prior to Subscriber porting. Call-flow figures, with the exception of FIG. 14, do not include the Signal Transfer Point (STP) or its network connections, as this component is not needed to show the flow of the Local Number Portability (LNP) call.

Scenario 1—Local Calls

Inter-switch

Figure 14:
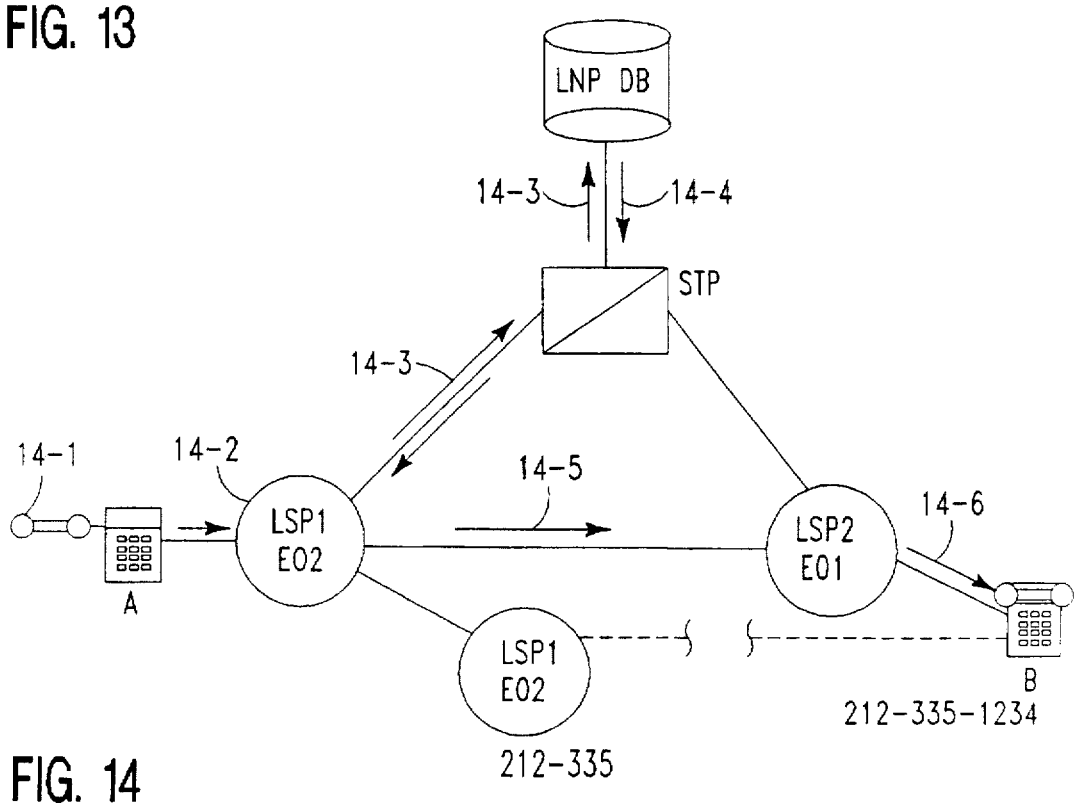

FIG. 14 illustrates call flow for an inter-switch call (i.e., between multiple switches and/or multiple Local Service Providers). Subscriber A calls Subscriber B. Subscriber A dials 335-1234. The Local Service Provider (LSP1) End Office (EO1) performs digit analysis, and based on the dialed number, recognizes that it is a call to a ported (i.e. changed) number and is not served by LSP$_1$:EO1, and that an External Local Number Portability Database (LNP DB) query is required.

An SS7 Transaction Capabilities Application Part (TCAP) query is sent to the External Local Number Portability Database (LNP DB). (Step 14-3). The query to the External Local Number Portability Database (LNP DB) includes the complete 10-digit called-party number, NPA-NXX-XXXX.

The External Local Number Portability Database (LNP DB) receives the query, performs a look-up into the Local Number Portability (LNP) ported numbers table and returns routing information to the Local Service Provider (LSP1) End Office (EO1). The External Local Number Portability Database (TNP DB) receives the query, checks the dialed NPA-NXX-XXXX in its External Local Number Portability Database (LNP DB), and returns the corresponding Service Provider Area (SPA) Code plus the last seven digits of the dialed number (i.e., SPA-NXX-XXXX) (Step 14-4).

The Local Service Provider (LSP1) End Office (EO1) receives the response and routes the call to Local Service Provider (LSP2) End Office (EO1). That is, the Local Service Provider (LSP1) End Office (EO1) receives the Local Number Portability (LNP) response containing SPA-NXX-XXXX. Based on the Service Provider Area (SPA) Code-NXX, the Local Service Provider (LSP1) End Office (EO1) routes the call to Local Service Provider (LSP2) End Office (EO1) (Step 14-5).

The Local Service Provider (LSP2) End Office (EO1) terminates the call to Subscriber B. That is, the Local Serviced Provider (LSP2) End Office (EO1) receives the call, retranslates the Service Provider Area (SPA) Code back to NPA, and terminates the call to Subscriber B (Step 14-6).

Intra-switch

Figure 15:
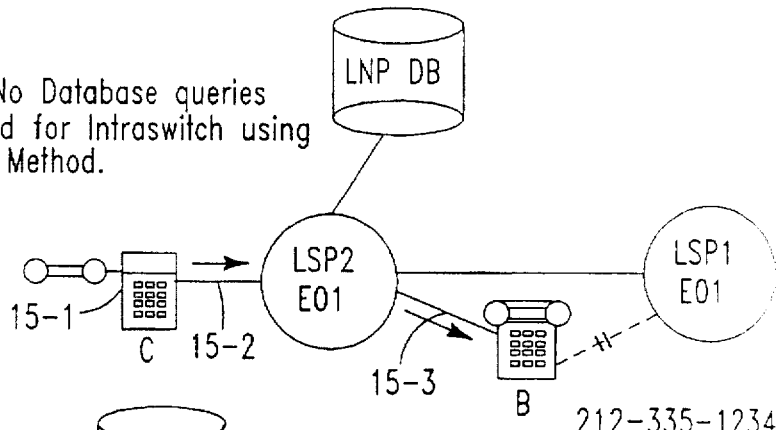

FIG. 15 is a call flow for an intra-switch call (i.e., one that involves only one switch). Here, Caller C on Local Service Provider (LSP2) End Office (EO1) dials 335-1234 to reach Subscriber B. That is, Subscriber C, in the example dials 335-1234 to reach Subscriber B (Step 15-1). The Local Service Provider (LSP2) End Office (EO1) recognizes 335 as an exchange code now served on its own switch. That is, Local Service Provider (LSP2) End Office (EO1) receives the call from Subscriber and performs digit analysis. Based on the dialed number, it determines that the dialed number resides in its own switch, and therefore an External Local Number Portability Database (LNP DB) query is not required. The call is completed within the switch.

Scenario 2—Toll Calls

Direct IXC Connectivity

The following scenarios depict toll calls (i.e., calls involving an interchange carrier (Inter Exchange Carrier (IXC)) transporting some portion of the call).

Figure 16:
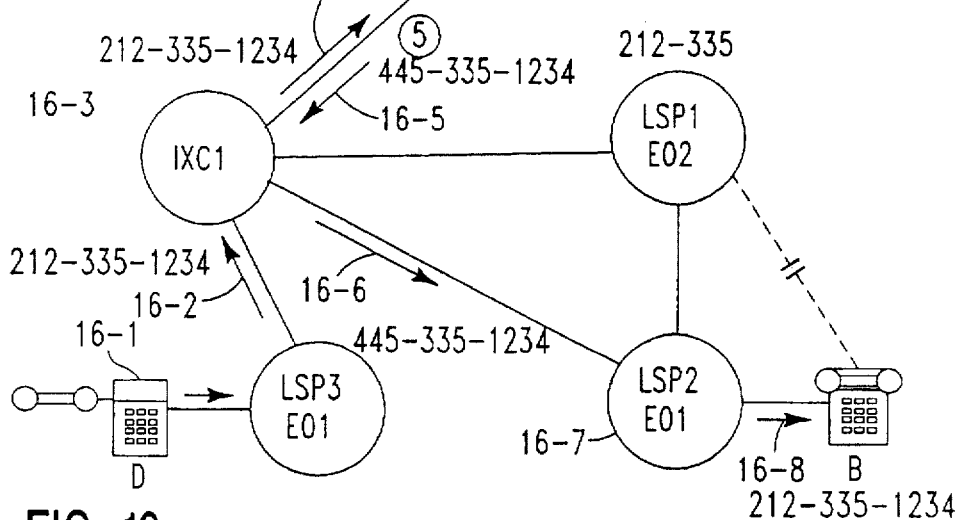

Referring to FIG. 16, Subscriber D calls Subscriber B. Subscriber D dials (212) 335-1234. Local Service Provider (LSP3) routes call to Subscriber D's pre-subscribed Inter Exchange Carrier (IXC1). Inter Exchange Carrier (IXC1) dips into the External Local Number Portability Database (LNP DB). FIG. 16 shows a toll call in which the Inter Exchange Carrier (IXC) has direct connectivity to the Local Service Provider LSP that terminates the call. A call originates in Local Service Provider (LSP3); traverses the Inter Exchange Carrier (IXC) network, which performs an External Local Number Portability Database (LNP DB) query; and then is routed to the correct LSP in the terminating Local Access and Transport Area (LATA).

The sequence begins when Subscriber D dials 212-335-1234 to reach Subscriber B (Step 16-1). Local Service Provider (LSP3) recognizes this as a "1-" call and routes it directly to Subscriber D's prescribed Inter Exchange Carrier (IXC1) (Step 16-2). Inter Exchange Carrier (IXC1) determines that the NPA-NXX sent from Local Service Provider (LSP3) is portable (Step 16-3), and queries the External Local Number Portability Database (LNP DB) (Step 16-4).

The External Local Number Portability Database (LNP DB) responds to the query by returning SPA-NXX-XXXX for the Subscriber number (Step 16-5). The Inter Exchange Carrier (IXC1) switch routes call to Local Service Provider (LSP2) End Office (EO1). (Step 16-6). The Local Service Provider (LSP2) End Office (EO1) determines that this number is in its switch (Step 16-7) terminates to Subscriber B (Step 16-8).

Indirect IXC Connectivity

Figure 17:
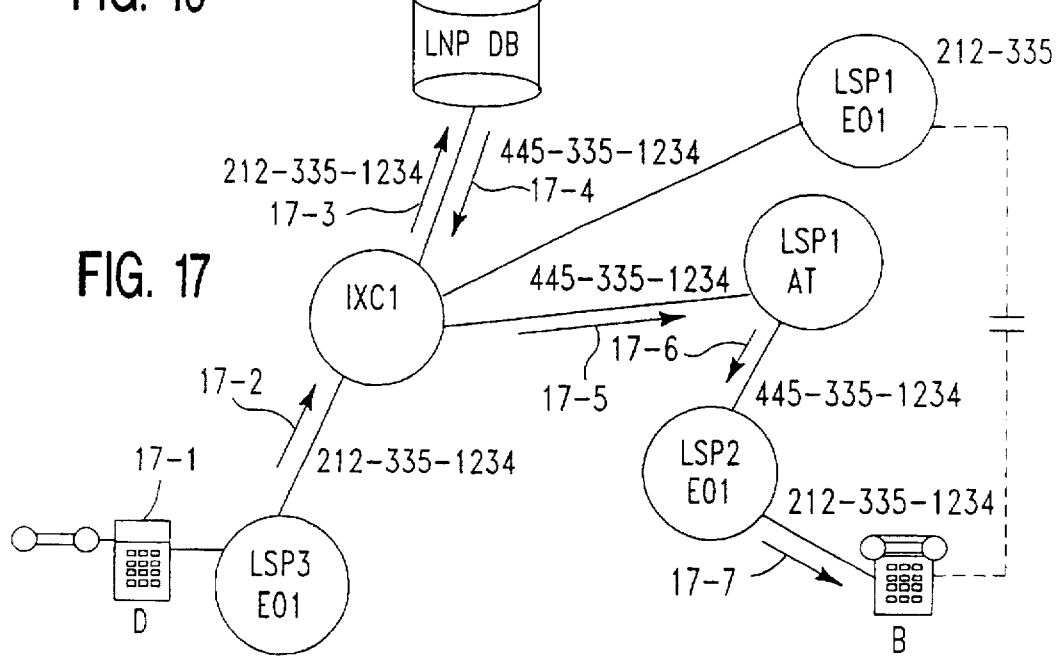

FIG. 17 shows indirect Inter Exchange Carrier (IXC) connectivity to the Local Service Provider (LSP) via an access tandem. This situation typifies Inter Exchange Carrier (IXC)s that do not have direct connectivity to all Local Service Providers in the area and must hand off some calls to the access tandem, which then terminates them to the correct Local Service Provider. The call originates in Local Service Provider (LSP3), traverses the Inter Exchange Carrier (IXC) network where an External Local Number Portability Database (LNP DB) query is performed, and is then terminated to an access tandem that routes it to the correct Local Service Provider (LSP) in the terminating Local Access and Transport Area (LATA). Alternatively, the access tandem could perform the database query if the Inter Exchange Carrier (IXC) lacks this capability.

Consider, for example, that Subscriber D dials 212-335-1234 to reach Subscriber B (Step 17-1). The Local Service Provider (LSP3) recognizes this as an Inter-LATA call and routes it to Subscriber D's pre-subscribed Inter Exchange Carrier (IXC1) (Step 17-2). Inter Exchange Carrier (IXC1) determines that the NPA-NXX sent from Local Service Provider (LSP3) is portable, and performs a database query to the External Local Number Portability Database (LNP DB) (Step 17-3). The External Local Number Portability Database (LNP DB) returns SPA-NXX-XXXX for the Subscriber number (Step 17-4). Because Inter Exchange Carrier (IXC1) does not have direct connectivity with the correct Local Service Provider (LSP2), it routes the call to an access tandem, Local Service Provider (LSP1) access tandem (AT) (Step 17-5). Local Service Provider (LSP1) at the access tandem (AT) uses SPA-NXX to route the call to Local Service Provider (LSP2) (Step 17-6). Local Service Provider (LSP2) End Office (EO1) determines that this number is in its switch and terminates the call to Subscriber B (Step 17-7).

Alternatively, the Inter Exchange Carrier (IXC) may hand the call to an access tandem to perform the database query before routing to the correct Local Service Provider. In this case the trunks from IXC L with not have the SPA classmark and the Access Tandem would go to the External LNP Database.

Method of Moving a Subscriber Between Two Competing Local

Service Providers (LSPs) in a Service Provider Area (SPA)

Coded Local Area Number Portability (LNP) Architecture

Referring now to FIGS. 18–25, a method is described for enabling a Subscriber to change from the its present (i.e., old) subscribed Local Service Provider (LSP) to a new Local Service Provider (LSP) with minimum interruption of service to the Subscriber and with minimum coordination required between the competing Local Service Providers (LSPs). A Subscriber will be considered to have "moved" to the new Local Service Provider (LSP) when the External Local Number Portability Database (LNP DB) has been updated to include new call routing information needed to route a call to the new Local Service Provider (LSP). For Service Provider Portability this new call routing information consists of the new Service Provider Area (SPA) code, here SPA', being populated (i.e., being stored in) the External Local Number Portability Database (LNP DB). For location portability, as described above, the Service Provider Area (SPA) code, as well as a new seven digit routing number NYY-YYYY, will be populated in the External Local Number Portability Database (LNP DB). The method is summarized in FIG. 18. It should first be noted that on "MOVE DAY", (i.e., the day of the change over to the new Local Service Provider (LSP)), the old Local Service Provider (LSP) will continue to service the Subscriber for the entire "MOVE DAY". That is, the telephone of the Subscriber will remain connected to the old Local Service Provider (LSP) switch, at least until the Subscriber is connected to the new Local Service Provider (LSP) and the new Service Provider Area (SPA) code, i.e., SPA', is stored in the External Local Number Portability Database (LNP DB).

Figure 19:
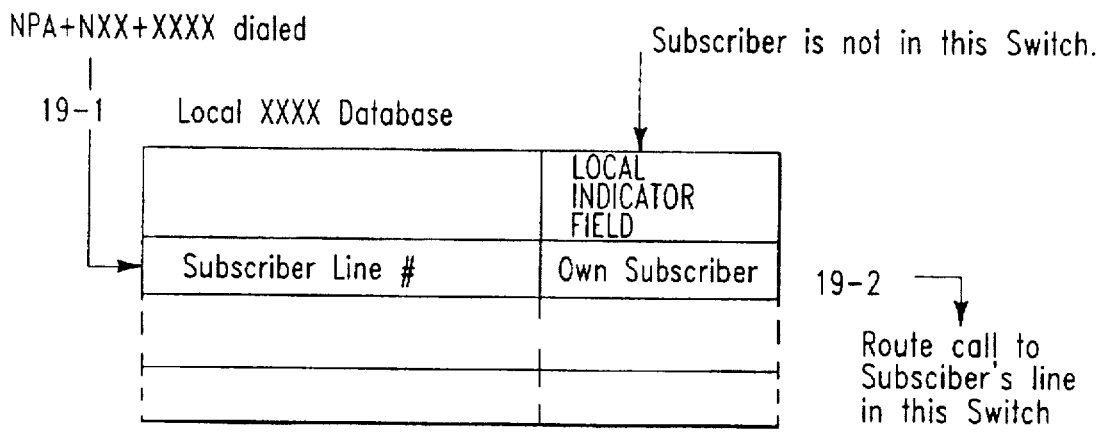
FIGS. 19–25 are flow diagrams showing in more detail the process changing the Subscriber from one of the Local Service Provides (LSPs) to another one of the Local Service Providers (LSPs) in accordance with the invention.
Figure 20:
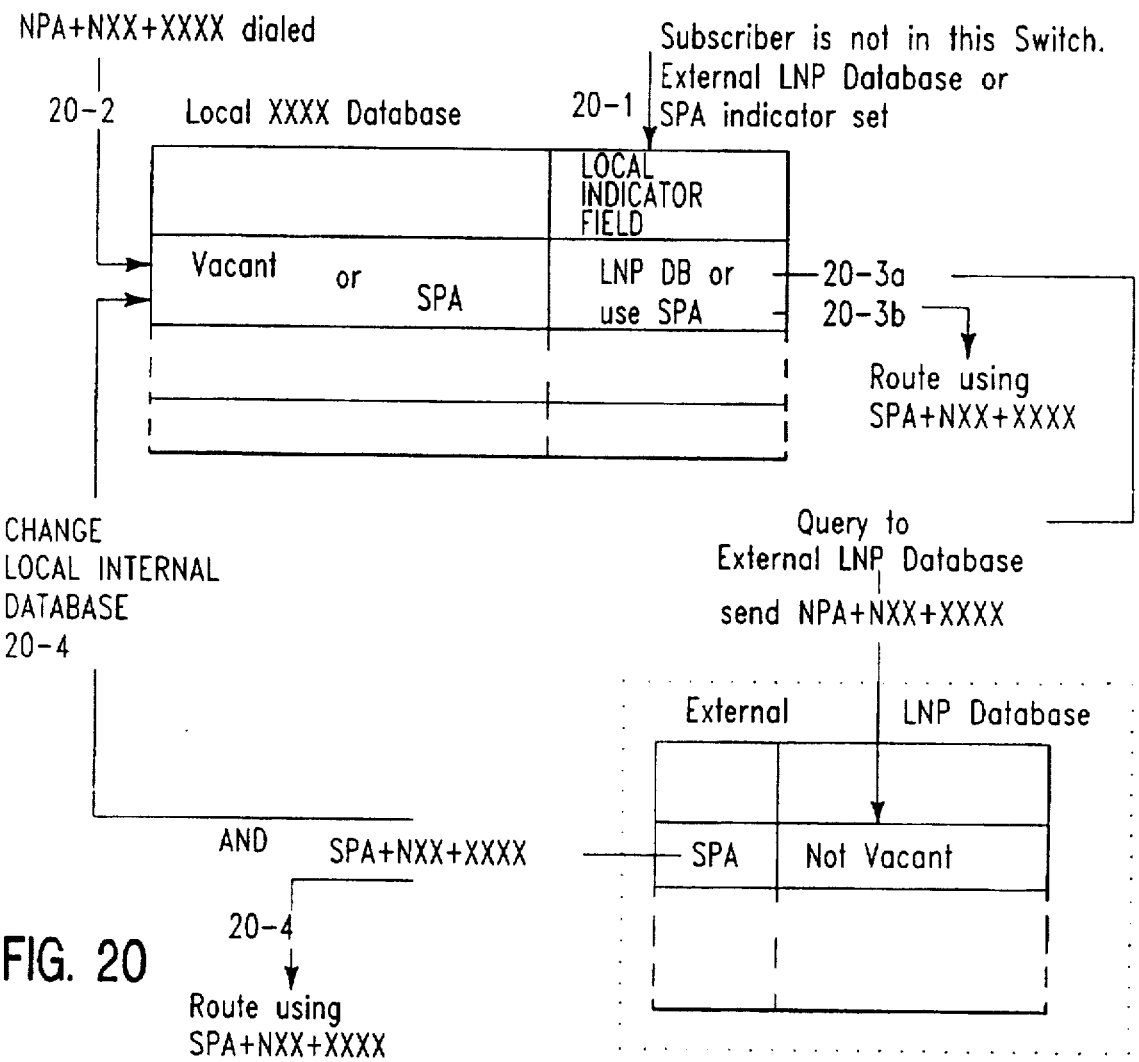

Several days before "Move Day", the following initial conditions (FIG. 18, Step 18-1) exist at the switch presently connected to the Subscriber (i.e.,the old Local Service Provider (LSP) switch) and at the switch to which the Subscriber will be connected (i.e., the new Local Service Provider (LSP) switch). These initial conditions are shown in FIGS. 19 and 20 and for the old Local Service Provider (LSP) switch and the new Local Service Provider (LSP) switch, respectively. Thus, in the initial condition, the internal database at the old Local Service Provider (LSP) switch (FIG. 19) contains the Subscriber's line number, XXXX and therefore any incoming call, NXX-XXXX, (Step 19-1) is routed to the Subscriber's XXXX line (Step 19-2).

The internal database at the new Local Service Provider (LSP) switch (FIG. 20) may have the Service Provider Area (SPA) of the Subscriber if such new switch had previously accessed the External Local Number Portability Database (LNP DB), as described above (Step 20-1). The Subscriber would not yet (i.e., in the initial condition) be stored in the internal database of, or connected to, the new switch. Thus, the internal database of the new switch will store at XXXX either a vacant indication, or the Subscriber's current Service Provider Area (SPA) code. Therefore, during this initial condition, any call to the new switch with NPA-NXX-XXXX (Step 20-2) will show either: (1) a vacant code in the internal database of the new switch and a call to the new switch will result in an inquiry being made to the External Local Number Portability Database (LNP DB) (Step 20-3a); or, the Subscriber's old Service Provider Area (SPA) (Step 20-3b). If the Subscriber is vacant, (Step 20-3a), a query is made to the External Local Number Portability Database (LNP DB) (which has the Service Provider Area (SPA) stored for the ported Directory Numbers and the Service Provider Area (SPA) codes of the Local Service Provider (LSP) for those numbers that are not populated individually in the External Local Number Portability Database (LNP DB)), the call is routed as SPA-NXX-XXXX and the internal database at the new switch is updated with the old Service Provider Area (SPA) code of the Subscriber retrieved from the External Local Number Portability Database (LNP DB). (It should be noted that the External Local Number Portability Database (LNP DB) not only stores the Service Provider Area (SPA) codes of the ported Directory Numbers (DN) but also stores the Service Provider Area (SPA) of the incumbent Subscribers of the Local Service Provider (LSP)).

On the other hand, if the internal database at the new switch had previously been updated with the Subscriber's present (i.e., old) SPA (Step 20-3b), the call is routed with SPA-NXX-XXXX without going to the External Local Number Portability Database (LNP DB) (Step 20-4).

Figure 18:
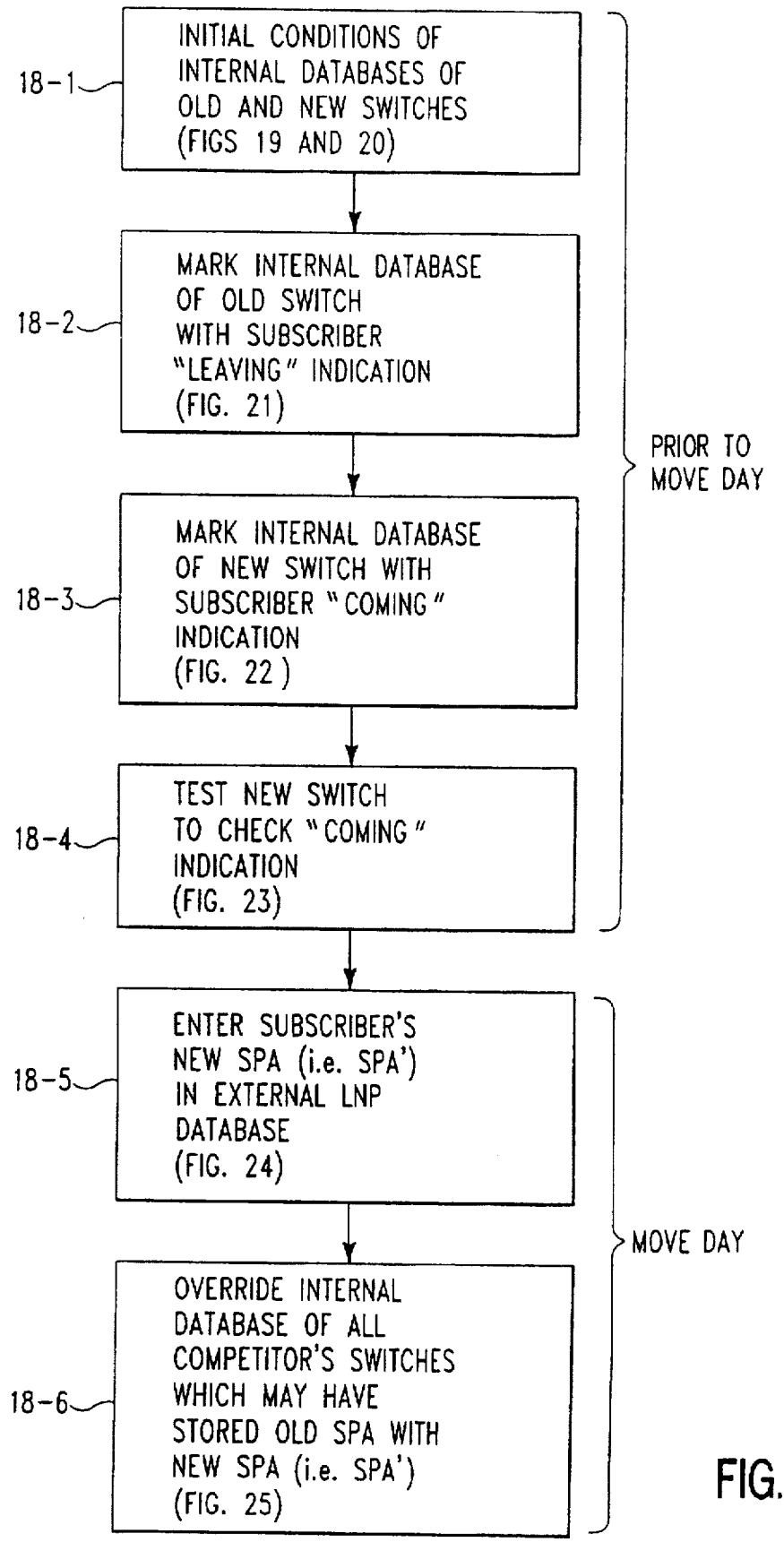
FIG. 18 is a flow diagram summarizing the process of changing a Subscriber from one of the Local Service Provides (LSPs) to another one of the Local Service Providers (LSPs) in accordance with the invention.
Figure 21:
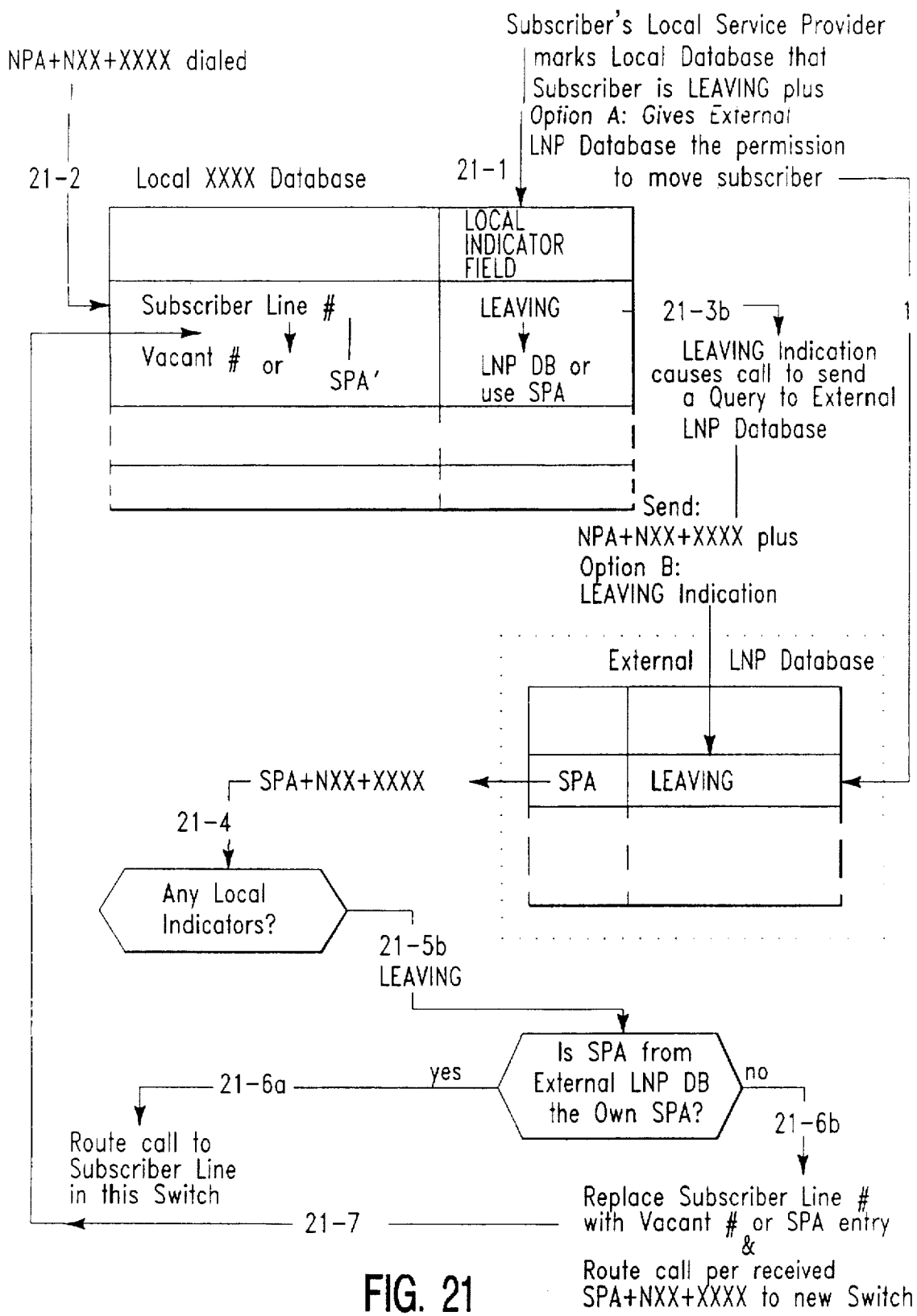
Figure 22:
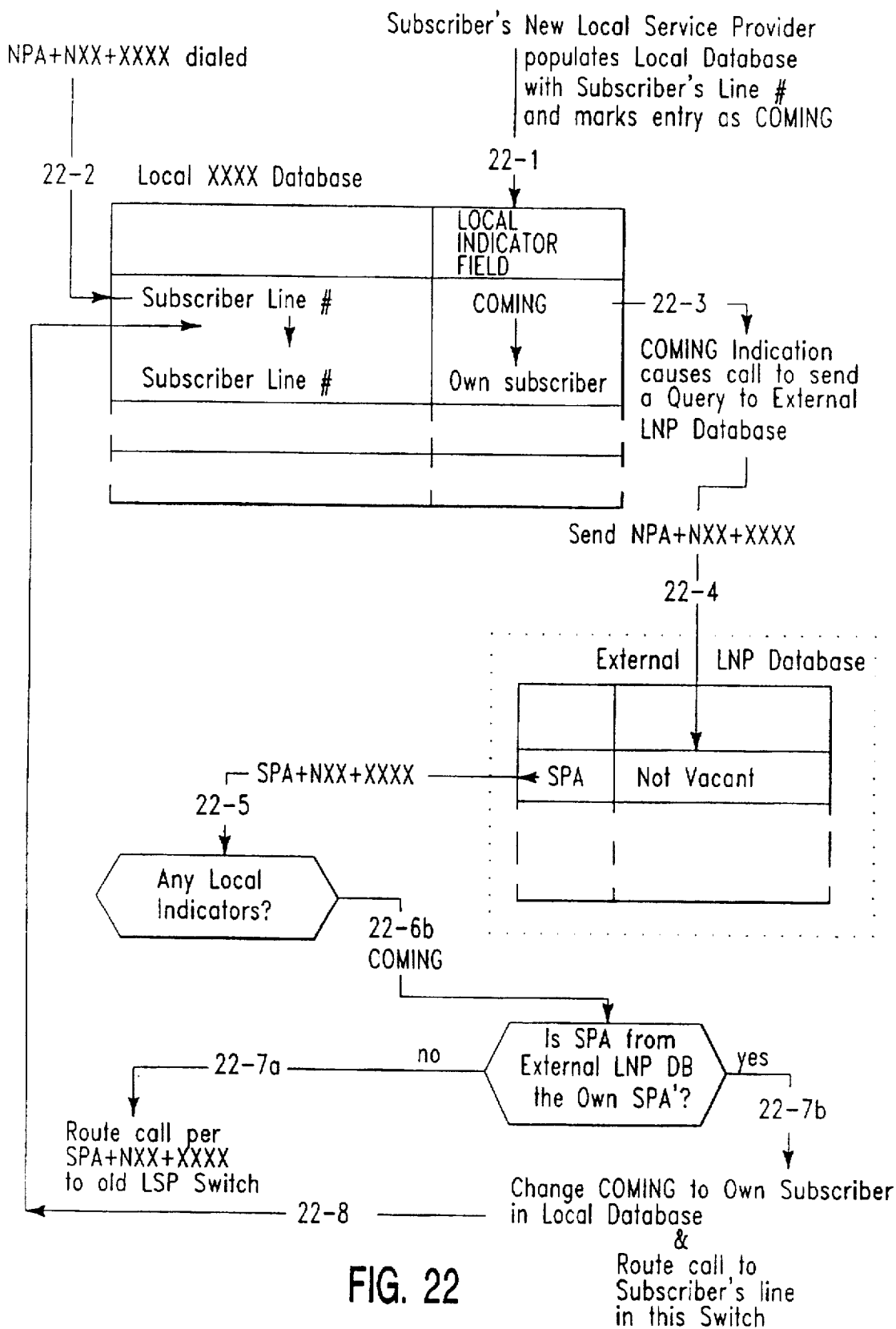
Figure 23:
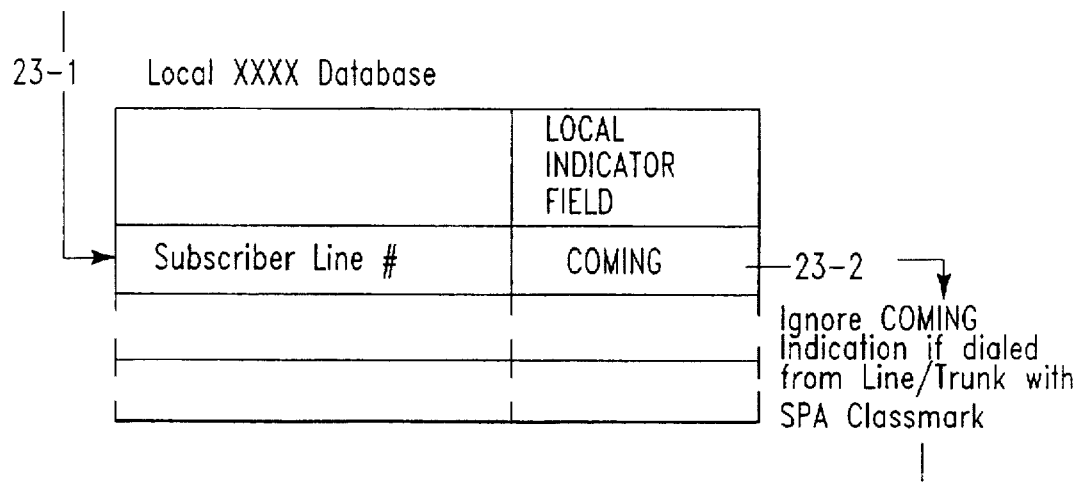

After the Subscriber informs the present and new Local Service Providers (LSPs) of the Move Day, the internal database at the Subscriber's XXXX line in the old switch will be indicated by the old Local Service Provider (SPA) as "LEAVING", as shown in FIG. 21 and FIG. 18, Step 18-2. That is, as noted above, the internal database of each local switch will include a Local Indicator Field for each subscriber line. The day before "Move Day", the Local Indicator Field at the Subscriber's present location, XXXX, in the internal database of the old switch is marked with a LEAVING indication (Step 21-1). This "LEAVING" indication will be treated by the local switch as if the Subscriber is vacant and will act as a trigger to access the External Local Number Portability Database (LNP DB) for every call that attempts to complete to the Subscriber's directory number. (Step 21-2). Such consultation is used to determine whether the Subscriber has actually "moved". Thus, with a LEAVING indication, the External Local Number Portability Database (LNP DB) is consulted to determine if the call (Step 21-3) should continue to be routed to the same line equipment (i.e., the current Local Service Provider's Service Provider Area (SPA) code), or if the "move" has been completed to the new Local Service Provider (LSP), in which case the call is routed to the New Local Service Provider's (LSP's) Service Provider Area (SPA) code, i.e., SPA' (Step 21-3). This query to the External Local Number Portability Database (LNP DB) is made for every call where a LEAVING indication appears. For security reasons, (i.e., preventing unauthorized changes to the External Local Number Portability Database (LNP DB)), this LEAVING indication is forwarded to the External Local Number Portability Database (LNP DB) as part of the query and is stored therein against this NPA-NXX-XXXX as an indication that the External Local Number Portability Database (LNP DB) entry may be modified by the new Local Service Provider (LSP); this is labelled Option B in FIG. 21. Optionally, the LEAVING indication can be forwarded to the External Local Number Portability Database (LNP DB) for storage therein by a service technician (or craftsperson) in the old Local Service Providers (LSPs) office; this is labelled Option A in FIG. 21. If, after receiving a response from the External Local Number Portability Database (LNP DB) (Step 21-4) a LEAVING indication is detected (Step 21-5b) and if the Service Provider Area (SPA) code retrieved from the External Local Number Portability Database (LNP DB) is the old Local Service Provider's (LSP's) Service Provider Area (SPA) code, the call is routed to the Subscriber's current line in the old switch, Step 21-6a. If, however, the Service Provider Area (SPA) code retrieved from the External Local Number Portability Database (LNP DB) is not the Service Provider Area (SPA) code of the Old Local Service Provider (LSP), i.e., it is the new Service Provider Area (SPA) code, SPA', of the new Local Service Provider (LSP), (Step 21-6b) the call is routed as SPA-NXX-XXXX, where the SPA is the new Service Provider Area (SPA) code, i.e., SPA', (Step 21-7); also, the XXXX position in the old switch's internal database is either: changed from the Subscriber's line; or, the new Local Service Provider's (LSP's) Service Provider Area (SPA) code, i.e, SPA' is added to the internal database of the old switch, as described above. That is, if marked LEAVING, the External Local Number Portability Database (LNP DB) must be consulted to determine if the Subscriber has left; i.e. been assigned the new Service Provider Area (SPA) code, SPA'. Thus, after Step 21-7, any call NPA-NXX-XXXX to the Old switch will query the External Local Number Portability Database (LNP DB), (i.e., when the line is indicated as vacant) and obtain the new Service Provider Area (SPA) code, i.e., SPA'; or, will receive the new Service Provider Area (SPA) code, i.e. SPA', directly from its own internal database.

Optionally, the tip and ring may be physically connected together at the old Local Service Provider's (LSP's) switch at the time of the move. This places the line in the Permanent Condition. Thus, if a call is placed to line in the Permanent Condition, the External Local Number Portability Database (LNP DB) may be accessed to verify whether the old Local Service Provider's (LSP's) Service Provider Area (SPA) code is still assigned to the associated directory number. If the External Local Number Portability Database (LNP DB) replies with a Service Provider Area (SPA) code that is not the old Local Service Provider's (LSP's) Service Provider Area (SPA) code, the Subscriber will be canceled (i.e., changed to a vacant number or the new Service Provider Area (SPA) code, i.e., SPA'. Further, a GONE indication may be placed in the Old switch to allow the field technician to delete the Subscriber data at a later date. In this case, the GONE indication will be used the same as the Vacant entry in the local database of the old switch.

It should be noted that when a competitor's Service Provider Area (SPA) code is returned from the External Local Number Portability Database (LNP DB), the internal database of the old switch may be purged of the routing information to the Subscriber's line immediately and automatically. Alternatively, the local database may be marked in the Local Indicator Field as "Gone" and the translation to the local line equipment of the Subscriber may be deleted at a later date when the line is needed for a new Subscriber, for example. In the later case, a line marked "Gone" may be used the same as an unassigned line for a new directory number in the local switch.

If it becomes a government imposed requirement that the present (i.e., old) Local Service Provider (LSP) must notify the owner of the External Local Number Portability Database (LNP DB) that they are giving up the Subscriber, the present, old, switch will send a "LEAVING" message automatically that sets the "LEAVING" indication in the internal database of the old switch. For security reasons discussed above, the External Local Number Portability Database (LNP DB) will store this indication against the particular directory number as a prerequisite to accepting a request by the Subscriber's new Local Service Provider (LSP) to change the routing information indicated.

Prior to "Move Day (FIG. 18, Step 18-3)", the Subscriber's new Local Service Provider (LSP) will populate the internal database of the new switch with the Subscriber's line number (FIG. 22, Step 22-1) to route calls to the appropriate new line equipment and mark the Local Indication Field "COMING" (Step 22-1). With the Local Indication Field marked COMING, all calls will query the External Local Number Portability Database (LNP DB) to determine whether the "move" has taken place. Thus, all calls to the specific directory number, here, NPA-NXX-XXXX, (Step 22-2) will continue to access the External Local Number Portability Database (LNP DB) (Step 22-3) until the External Local Number Portability Database (LNP DB) returns the new Local Service Provider's (LSP's) own Service Provider Area (SPA) code, i.e., SPA' in the routing information. When this happens, the new Local Service Provider's (LSP's) switch can delete the COMING indication thereby eliminating the need for further accesses to the External Local Number Portability Database (LNP DB) for the specific directory number. More particularly, referring to FIG. 22, if a call dialed NPA-NXX-XXXX comes into the new Local Service Provider's (LSP's) switch (Step 22-2), as for example, if the calling party is a Subscriber to the new Local Service Provide's (LSP's) switch, the COMING indication in the Local Indicator Field (Step 22-3), along with NPA-NXX-XXXX queries the External Local Number Portability Database (LNP DB) (Step 22-4) and retrieves the present, old Service Provider Area (SPA) code of the called Subscriber (Step 22-5). This COMING indication is stored in the switch of the new Local Service Provider (LSP) which will service the NXX exchange. The other Local Service Provider's (LSP's) switches which also serve the same NXX exchange will have an entry of Vacant or the old Service Provider Area (SPA) code for the XXXX line. A determination (Step 6b) is made at the new Local Service Provider's (LSP's) switch that the Local Indication Field is COMING. If the Service Provider Area (SPA) code retrieved from the External Local Number Portability Database (LNP DB) (Step 22-5) is the new Local Service Provider's (LSP's) Service Provider Area (SPA) code, i.e., SPA', (Steps 22-6b, 22-7b) the Local Indicator Field is changed from COMING to OWN SUBSCRIBER (i.e., OWN SUB) (Step 22-8) and the call is routed to the Subscriber's Line in this new Local Service Provider (SPA) switch (Step 22-8). It should be noted that for both COMING or LEAVING we go to External Local Number Portability Database (LNP DB) to determine if we have moved yet (i.e., is the Service Provider Area (SPA) code retrieved from the External Local Number Portability Database (LNP DB) the old Service Provider Area (SPA) code, or the new Service Area Provider (SPA) code, SPA'. If, on the other hand, the Service Provider Area (SPA) code retrieved from the External Local Number Portability Database (LNP DB) was not the new Service Provider Area (SPA), i.e., not SPA', the call is routed per SPA-NXX-XXXX to the old Local Service Provider (LSP) switch (Step 22-7a).

Test calls are made to determine if the Subscriber's data has been populated properly in the new Local Service Provider's (SPA') switch; i.e., to detect whether the Subscriber's line, and the features are working properly in the new switch (FIG. 18, Step 18-4). More particularly, referring to FIG. 23, the Subscriber's new Service Provider Area (SPA) code, i.e., SPA' plus NXX-XXXX is dialed from the test line/trunk with an "SPA classmark", (Step 23-1) (i.e., with a classmark indicating that the call obtained a Service Provider Area (SPA) code from the External Local Number Portability Database (LNP DB)). In the internal database of the new Local Service Provider's (LSP's) switch, the COMING indication is ignored and the call is routed to the Subscriber's line (Step 23-2). Typically, a telephone will be connected temporarily to the future Subscriber's line in the new switch.

Figure 24:
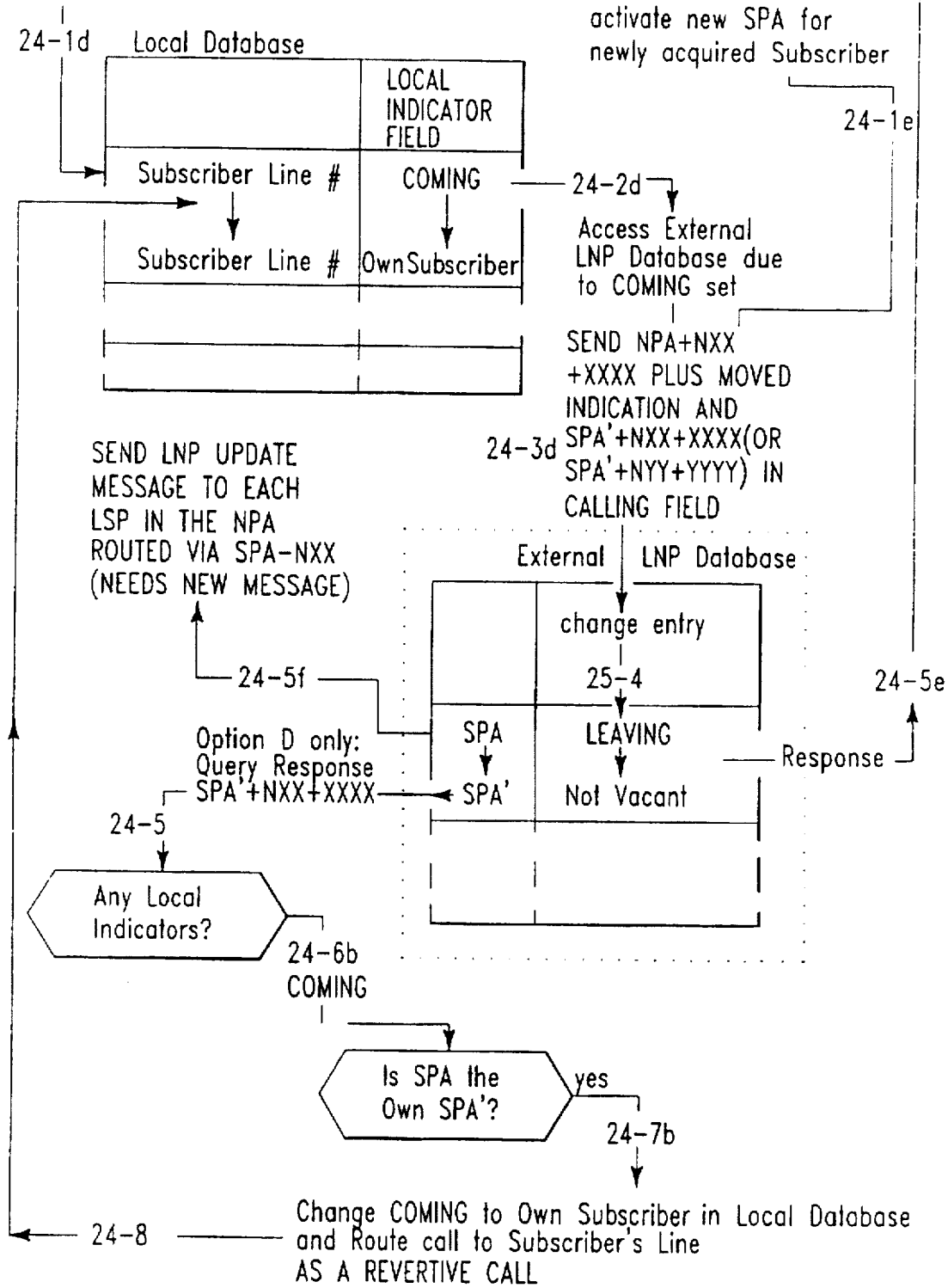

On "Move Day", the External Local Number Portability Database (LNP DB) is changed to-have stored therein the new Service Provider Area (SPA) code, i.e., SPA' (FIG. 18, Step 18-5). Referring to FIG. 24, the change may be made by either: (1) the new Local Service Provider (LSP) informing the External Local Number Portability Database (LNP DB) via a workstation, (Steps 24-1e, 24-3d, 24-4, 24-5e and 24-5f); or, alternatively, automatically as a result of a call from the new Subscriber's line to the Subscriber's Directory Number (Steps 24-1d, 24-2d, 24-3d, 24-4, 24-5, 24-6b, 24-7b, 24-8 and 24-5f). In the former case, the Subscriber's new Local Service Provider (LSP) communicates with the External Local Number Portability Database (LNP DB) and activates the new Service Provider Area (SPA) code, i.e., SPA', for the newly acquired Subscriber. Thus, the new Local Service Provider (LSP) sends to the External Local Number Portability Database (LNP DB) NPA-NXX-XXXX plus the new Service Provider Area (SPA) code, i.e., SPA', and a change entry designation (Step 24-1e). A confirmation is sent back to the new Local Service Provider (LSP) (Step 24-5e).

In the later case, after connection to the new switch the Subscriber's own directory number, NXX-XXXX, is dialed (Step 24-1d) from the Subscriber's own line. The Subscriber's line number and the COMING designation are retrieved from the new switch's internal database (Step 24-2d). The External Local Number Portability Database (LNP DB) is accessed because of the COMING designation, as described. Because the call is coming from the Subscriber's own line, the query will also send a "moved indication" to the External Local Number Portability Database (LNP DB) along with the new Service provider Area (SPA) code, i.e., SPA', (Step 24-3d). In response to such signal, the External Local Number Portability Database (LNP DB) changes the old Service Provider Area (SPA) coded to SPA'. That is, the External Database overrides the old Service Provider Area (SPA) with the new Service Provider Area (SPA) code, i.e., SPA'. The response from the External Local Number Portability Database (LNP DB) is now SPA'-NXX-XXXX, (Step 24-5). Since there was a COMING indicator and the call was made from the Subscriber's own new line, the call will return to the Subscriber line as a Revertive Call (i.e., a Revertive Call is a call that reverts back to the originating callers line) (Step 24-7b). The indication COMING in the internal database of the new switch is changed to OWN SUBSCRIBER in the internal database of the new switch, and the call is routed to the Subscriber line (Step 24-8).

Figure 25:
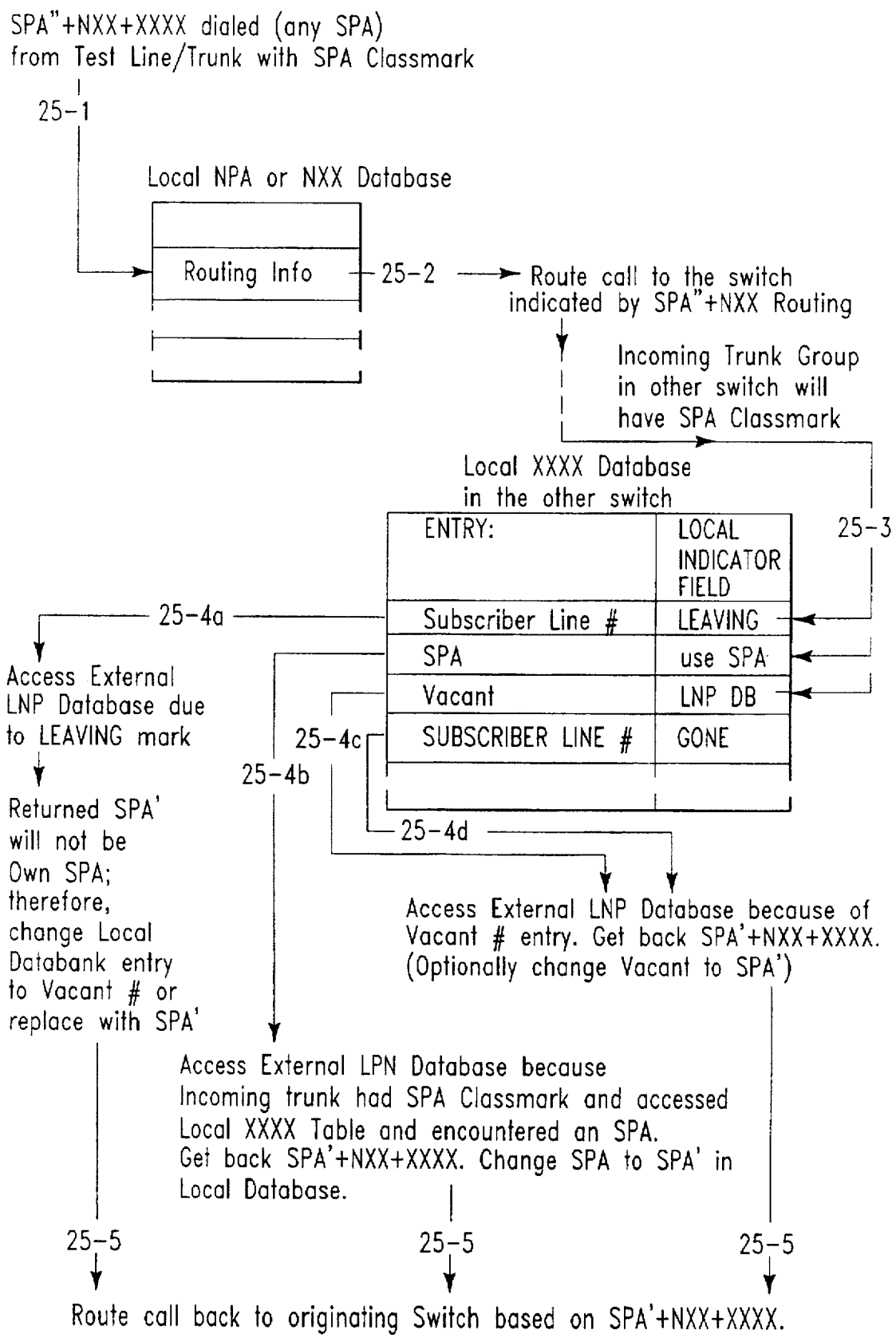
Figure 26:
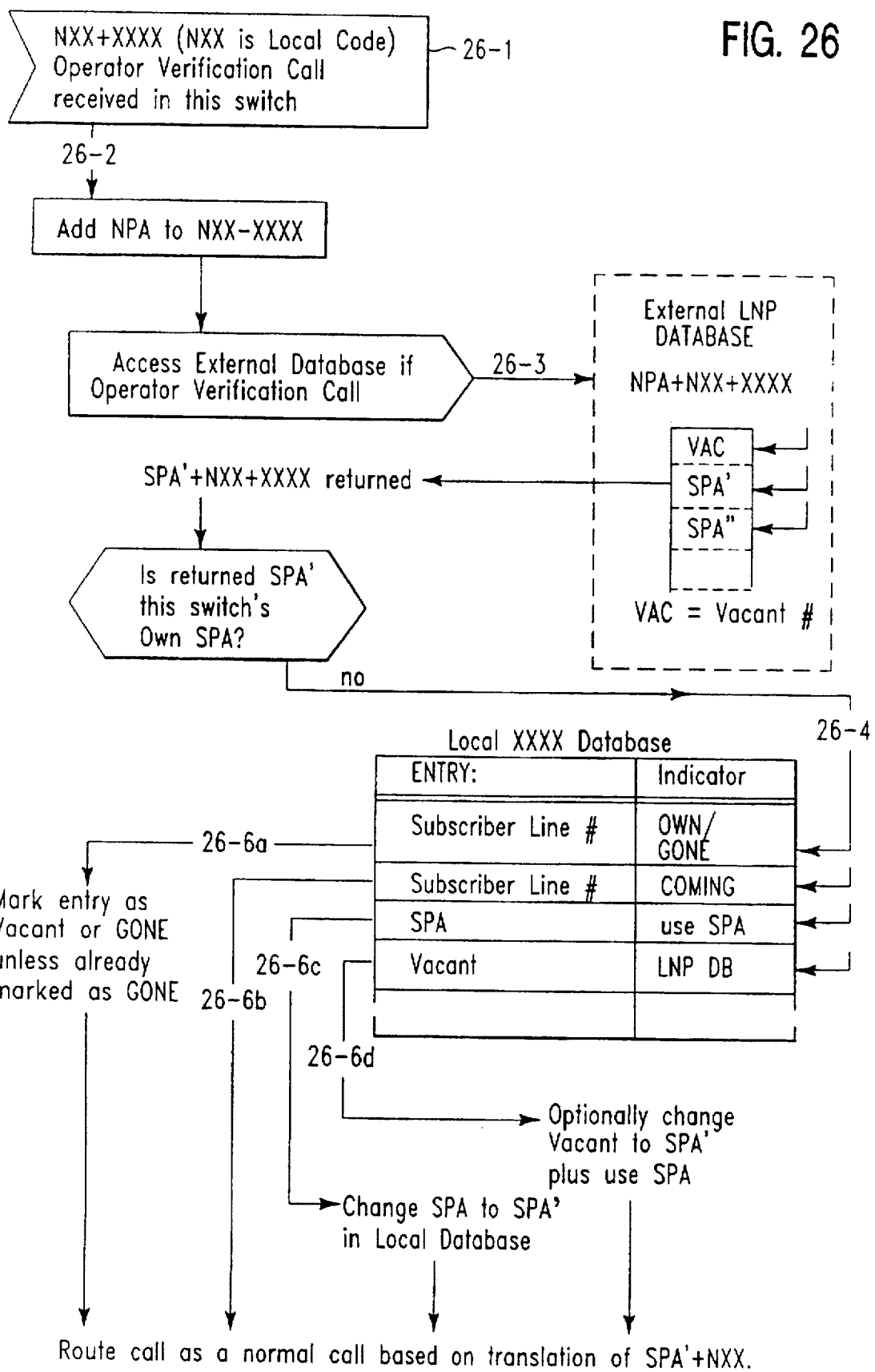
FIG. 26 is a flow diagram showing the steps of verification of reported errors in the system.

Having updated the External Local Number Portability Database (LNP DB), all other competing switches with the same exchange code, NXX, which have previously stored the Subscriber's old Service Provider Area (SPA) code as, for example, a result of an inquiry to the External Local Number Portability Database (LNP DB), must now have the previously stored old Service Provider Area (SPA) code changed to the new Service Provider Area (SPA) code, SPA', (FIG. 25 and FIG. 18, Step 18-6). In Step 25-1, the Subscriber is called, via a test port of the new switch, using the Service Provider Area (SPA) code of any other competing Local Service Provider (LSP), i.e., Service Provider Area (SPA) code SPA". That is, SPA" is the Service Provider Area (SPA) code of any other Local Service Provider (LSP) including the last, previous, old Service Provider Area (SPA) of the Subscriber. There is an Service Provider Area (SPA) code classmark added to the call to indicate that the first three digits were obtained from the External Local Number Portability Database (LNP DB). The call is routed (Step 25-2) to the other competitor's switches (i.e., a switch of the Local Service Provider (LSP) having the Service Provider Area (SPA) code, SPA"). When entering the internal database of the competitor's switch (Step 25-3) there are four possibilities:

(1) if it is to the old Local Service Provider (LSP), the switch will have a LEAVING indication and will therefore access the External Local Number Portability Database (LNP DB), as noted above (Step 25-4a). The new Service Provider Area (SPA) code, i.e., SPA' will be returned and therefore, a change is made to the local internal database to either vacant or an override to SPA. The call is routed back to the originating switch based on SPA'-NXX-XXXX (Step 25-5);

(2) if the switch has the old Service Provider Area (SPA) code, since the Subscriber does not exist in this switch, the call should not have routed to this switch and because of this inconsistency a query is made to the External Local Number Portability Database (LNP DB) to verify the call for errors. Because the External Local Number Portability Database (LNP DB), now has SPA', the Service Provider Area (SPA) code, SPA', will override the previous Service Provider Area (SPA) code (Step 25-4b). The call is routed back to the originating switch based on SPA'-NXX-XXXX (Step 25-5);

(3) if vacant, query is made to the External Local Number Portability Database (LNP DB) to retrieve the new Service Provider Area (SPA) code, SPA, (Step 25-4c). The switch can optionally change vacant to the new Service Area Provider Area (SPA) code, SPA'. In all cases the call is routed to the originating switch based on SPA'-NXX-XXXX. The call is routed back to the originating switch based on SPA'-NXX-XXXX (Step 25-5); or, (4) if marked GONE, query is made to the External Local Number Portability Database (LNP DB) to retrieve the new Service Provider Area (SPA) code, SPA', (Step 25-4d). The switch can optionally change vacant to the new Service Provider Area (SPA) code, SPA'. In all cases the call is routed to the originating switch based on SPA'-NXX-XXXX. Referring now to FIG. 26, a method for Operator verification of inconsistences between the External Local Number Portability Database (LNP DB) and the internal local switch database, is shown. Thus, a verification Operator, typically at the request of a Subscriber who has suspects he/she is not receiving calls from a specific LSP, enters the Subscriber's directory number NXX-XXXX into an SPA classmarked trunk group. This verification test will be performed for the switches belonging to all Local Service Providers (LSPs) servicing the NXX exchange. The Operator prefixes the Subscriber's NXX-XXXX with the suspect Local Service Provider's (LSP's) Service Provider Area (SPA) code, thus resulting in the Operator calling SPA-NXX-XXXX. The Operator routes the call as a verification to the proper Local Service Provider (LSP) switch per the Service Provider Area (SPA) code. The switch receives NXX-XXXX (Step 26-1). Once in that switch, the Number area Plan (NPA) is added (Step 26-2). The External Local Numbering Plan Database (LNP DB) is accessed (Step 26-3). If the SPA' returned is not the SPA of the switch (Step 26-4), the call is directed to the internal database of the local switch. If the local switch has either an "OWN" or "Gone" designation in the Local Indicator Field, the Local Indicator Field is automatically changed Gone or the entry is changed to VACANT (Step 26-6a). The call is routed as a normal call based on translation to SPA'-NXX. If the local switch had COMING in its Local Indicator Field, the call is routed as a normal call based on translation to SPA'-NXX (Step 26-6b). If the Local Indicator Field has the old SPA (Step 26-6c), the old SPA is changed to the new SPA' and is then routed as a normal call based on the translation of SPA'-NXX. If the local data base is vacant at XXXX (Step 26-6d) the vacant indication may be changed to the new SPA' and then the call is routed as a normal call based on the translation of SPA'-NXX.

Figure 27:
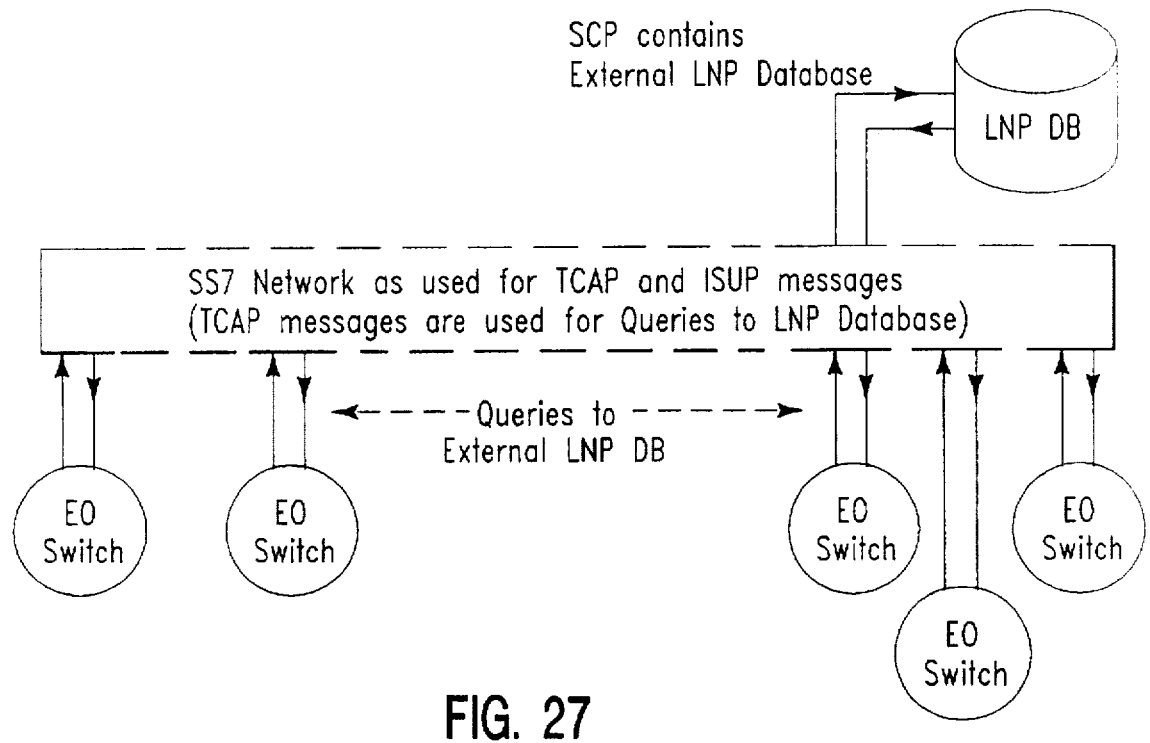
FIG. 27 is a schematic diagram of a system according to the invention wherein an SS7 network is used.
Figure 28:
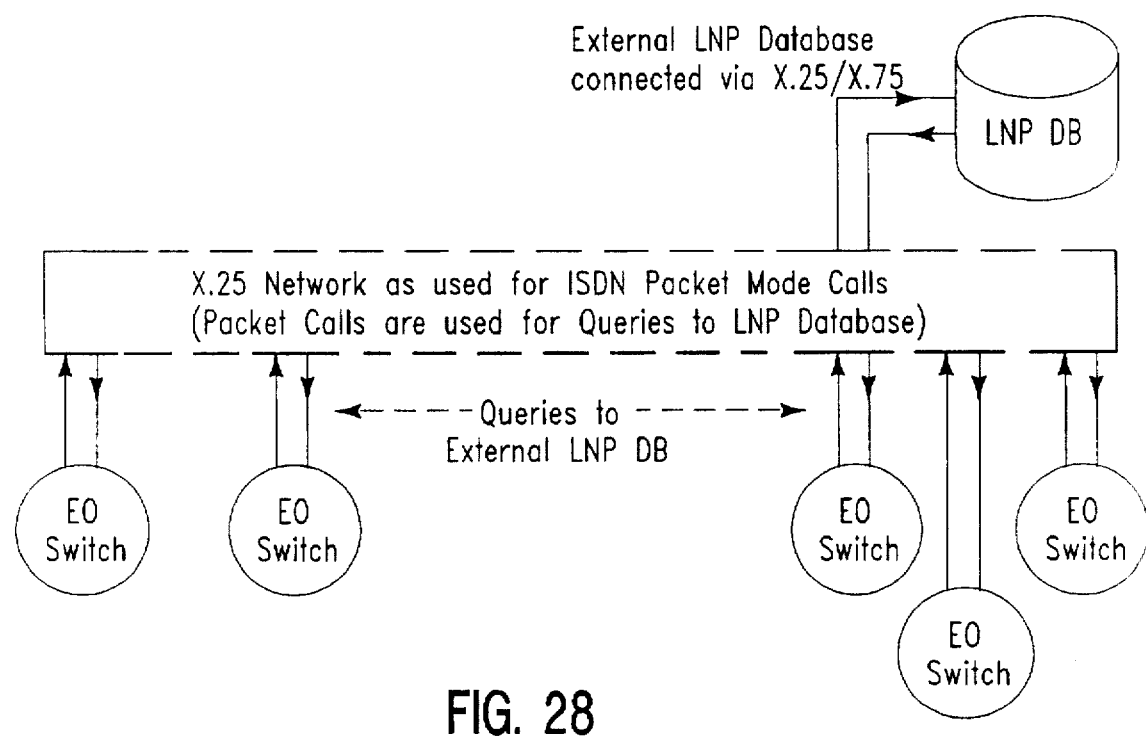
FIG. 28. is a schematic diagram of a system according to the invention wherein an X.25 network is used; and, FIG. 29 is a schematic diagram of a system according to the invention wherein an External Local Portability Database used therein is distributed among a plurality of Local Service Providers (LSPs).

Referring now to FIG. 27, the arrangement of the above described network is shown with the External Local Number Portability Database (LNP DB) coupled to End Office (EO) switches using a voice support, SS7 network. FIG. 28 shows the arrangement when a digital data packet, X.25 network is used. It should be noted that ISDN Subscriber's may use the same directory numbers for packet calls as for voice calls.

Figure 29:
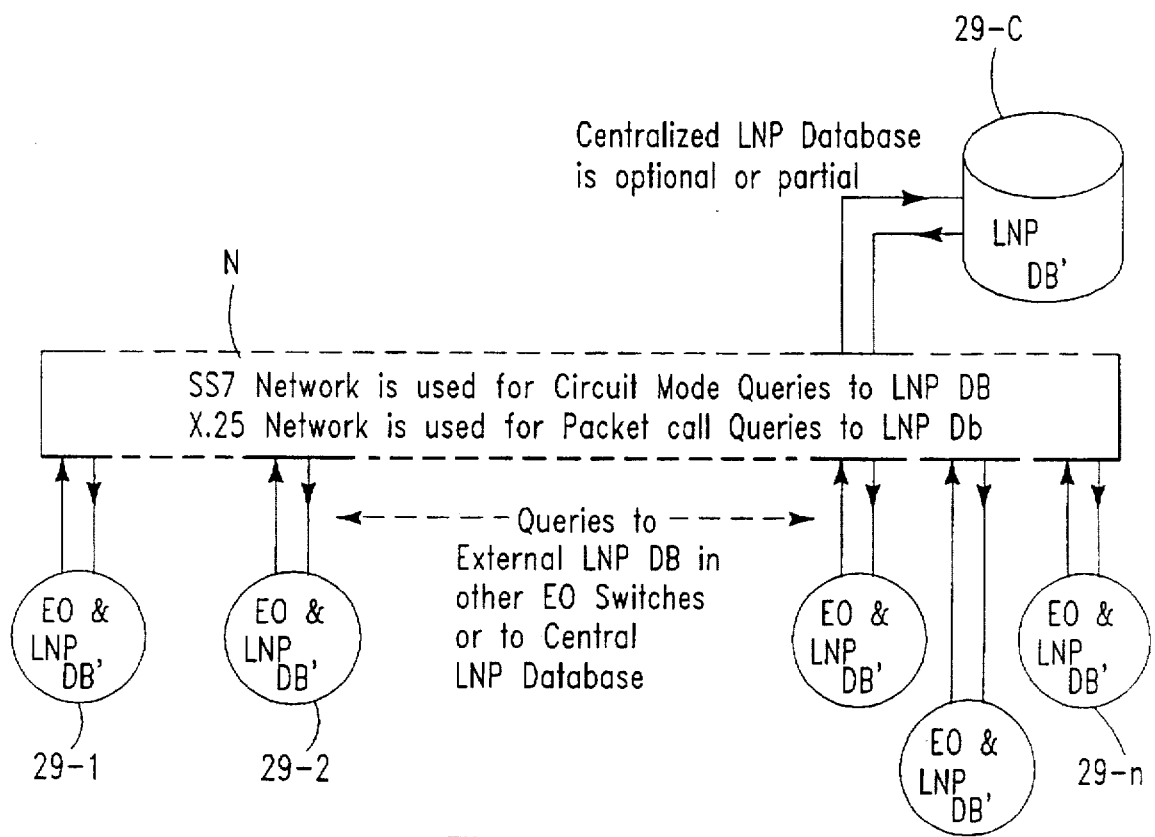

Referring now to FIG. 29, an arrangement is shown for distributing the External Local Number Portability Database (LNP DB) among the local switches internal databases. As discussed above, when a local switch retrieves a Service Provider Area (SPA) code from the External Local Number Portability Database (LNP DB), the retrieved Service Provider Area (SPA) code may be stored in the internal database of the switch to reduce queries to the External Local Number Portability Database (LNP DB). Thus, here each End Office (EO), i.e., EO 29-1 to 29-n, and a centrally located office 29-C, contains a subset (LNP DB)' of the External Local Number Portability Database (LNP DB) for those NPA-NXX-XXXX directory numbers for which the NPA-NXX is a local exchange code (Office code). This internal (LNP DB)' is updated from an Master External Local Number Portability Database (LNP DB), or from the specific switch that gets a new Subscriber. Any External Local Number Portability Database (LNP DB) queries are routed to the (LNP DB)' location based on the dialed NPA-NXX. The Master External Local Number Portability Database (LNP DB) owner may be designated, for each NPA-NXX, a set of, for example, 10,000 directory numbers. Thus, the Master External Local Number Portability Database (LNP DB) for a specific NPA-NXX may be located in the centralized LNP database 30-C, or in one of the End Office switches EO 29-1 through 29-n. The Master External Local Number Portability Database (LNP DB) may be accessed by any Local Service Provider (LSP). Each Local Service Provider (LSP) may route its queries to the Master External Local Number Portability Database (LNP DB) or to its own switch serving that NPA-NXX. The NPA-NXX will route the queries to the Master External Local Number Portability Database (LNP DB) and an SPA-NXX will route the queries to the specific Local Service Provider's (LSP's) switch serving that NXX. Therefore, consider that EO 29-1 want to query the External Database (LNP DB) for a specific SPA-NXX. The Network, N, here, either an SS7 or X.25 network, routes the query to the one of the EO's 29-2 to 29-n or to the centralized LNP database 29-C which has been designated the Master External Local Number Portability Database (LNP DB) for that NPA-NXX.

Other embodiments are within the spirit and scope of the appended claims.

What is claimed is:

1. A method for routing a call to a called Subscriber having an assigned directory number, NXX-XXXX or NPA-NXX-XXXX, and having moved to a different location served by a switch having a different exchange code, NYY, and a line code YYYY, comprising the steps of:

(a) dialing the directory number of the called Subscriber;

(b) determining from the dialed number, whether the call is an intra-LATA call or a call to an exchange code (NXX) served by a local switch, (i) if the call is to an exchange code (NXX) served by the local switch, determining whether the dialed directory number is served by the local switch; and, (A) if the dialed directory number is served by the local switch, routing the call to the called Subscriber using the directory number; and, (B) if the dialed directory number is not served by the local switch, accessing a database external to the local switch to obtain routing information for the call; and, (ii) if the call is an intra-LATA call, determining based on an NPA code of the dialed directory number and the dialed exchange code NXX of the dialed directory number, whether the dialed exchange code supports local number portability, and if it does, then accessing the database external to the local switch to obtain routing information for the call; and wherein accessing the database external to the local switch comprises the steps of:

(c) adding to the dialed directory number an NPA code if such NPA code is absent from the dialed directory number, to provide a database accessing number;

(d) retrieving from the database, in response to the database accessing number, a corresponding number comprising an SPA code of the called Subscriber's service provider plus the NYY exchange code plus the line code YYYY, where an SPA code is a three digit designation code assigned to each one of a plurality of Local Service Providers within a common Numbering Plan Area (NPA), each one of the Local Service Providers being assigned a different SPA code in the common Numbering Plan Area (NPA); and (e) routing the call using the corresponding number.

2. The method of claim 1, wherein the directory number, NXX-XXXX, and the NYY exchange code plus the line code YYYY have a same or different Number Plan Area (NPA) code.

3. A method for routing a call to a called subscriber using a dialed number comprising NXX-XXXX or NPA-NXX-XXXX, the method comprising the steps of:

(a) determining from the dialed number, whether: (1) the dialed number is served by a local switch serving a line from which the call is placed; or, (2) the call is an intra-LATA call and the dialed number is not served by the local switch; and, (i) if the dialed number is served by the local switch, then using the local switch to route the call to the called subscriber using the dialed number;

(ii) if the call is an intra-LATA call and the dialed number is not served by the local switch, determining, based on an NPA code of the dialed number and the exchange code NXX of the dialed number, whether local number portability is available for the dialed number;

(A) if local number portability is available for the dialed number, then accessing an External Local Number Portability Database using the dialed number to retrieve routing information comprising a Service Provider Area (SPA) code, an exchange code NYY and a line code YYYY, and routing the call using the routing information, where an SPA code is a three digit designation code assigned to each one of a plurality of Local Service Providers within a common Numbering Plan Area (NPA), each one of the Local Service Providers being assigned a different Service Provider Area (SPA) code in the common Numbering Plan Area (NPA); and, (B) if local number portability is not available for the dialed number, routing the call using the dialed number.

4. The method of claim 3, wherein prior to accessing the External Local Number Portability Database, if an NPA code is absent from the dialed number, prefixing the dialed number with an NPA code corresponding to the dialed number and using the prefixed dialed number to access the External Local Number Portability Database.

5. The method of claim 3, further comprising using the routing information to provide a number SPA-NYY-YYYY and routing the call using the number SPA-NYY-YYYY.

* * * * *